United States Patent
Mori et al.

(10) Patent No.: US 10,852,892 B2
(45) Date of Patent: Dec. 1, 2020

(54) TOUCH PANEL AND DISPLAY APPARATUS

(71) Applicant: Mitsubishi Electric Corporation, Tokyo (JP)

(72) Inventors: Seiichiro Mori, Tokyo (JP); Masafumi Agari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/243,209

(22) Filed: Jan. 9, 2019

(65) Prior Publication Data

US 2019/0220115 A1   Jul. 18, 2019

(30) Foreign Application Priority Data

Jan. 18, 2018   (JP) .................. 2018-006075

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0446* (2019.05); *G06F 3/04186* (2019.05); *G06F 3/0412* (2013.01); *G06F 3/0445* (2019.05); *G06F 2203/04105* (2013.01); *G06F 2203/04107* (2013.01)

(58) Field of Classification Search
CPC .... G06F 3/0416; G06F 3/04186; G06F 3/044; G06F 3/0446; G06F 2203/04105; G06F 2203/04107; G06F 3/0412; G06F 3/0445
See application file for complete search history.

(56) References Cited

U.S. PATENT DOCUMENTS

| | | | |
|---|---|---|---|
| 2012/0113054 A1 | 5/2012 | Hashimoto et al. | |
| 2015/0371608 A1 | 12/2015 | Yamaguchi et al. | |
| 2017/0010729 A1* | 1/2017 | Chuang | G06F 3/0414 |
| 2017/0308222 A1* | 10/2017 | Takano | G02F 1/13338 |
| 2018/0018051 A1* | 1/2018 | Ogura | G06F 3/041 |
| 2018/0059869 A1* | 3/2018 | Ma | G06F 3/044 |

FOREIGN PATENT DOCUMENTS

| | | |
|---|---|---|
| JP | 5866526 B2 | 2/2016 |
| JP | 5971608 B1 | 8/2016 |
| WO | 2010/147042 A1 | 12/2010 |

* cited by examiner

*Primary Examiner* — Nelson M Rosario
(74) *Attorney, Agent, or Firm* — Studebaker & Brackett PC

(57) ABSTRACT

A touch panel includes a touch sensor panel including a touch sensor capable of detecting a change in electrostatic capacitance formed between the touch sensor panel and a pointer, a pressure sensor capable of detecting a pressure on a touch surface of the touch sensor panel as a change in electrostatic capacitance, and a shield layer. The shield layer is disposed between the touch surface and the pressure sensor so as to be overlapped with at least a part of the pressure sensor as viewed from the touch surface.

11 Claims, 19 Drawing Sheets

F I G. 1
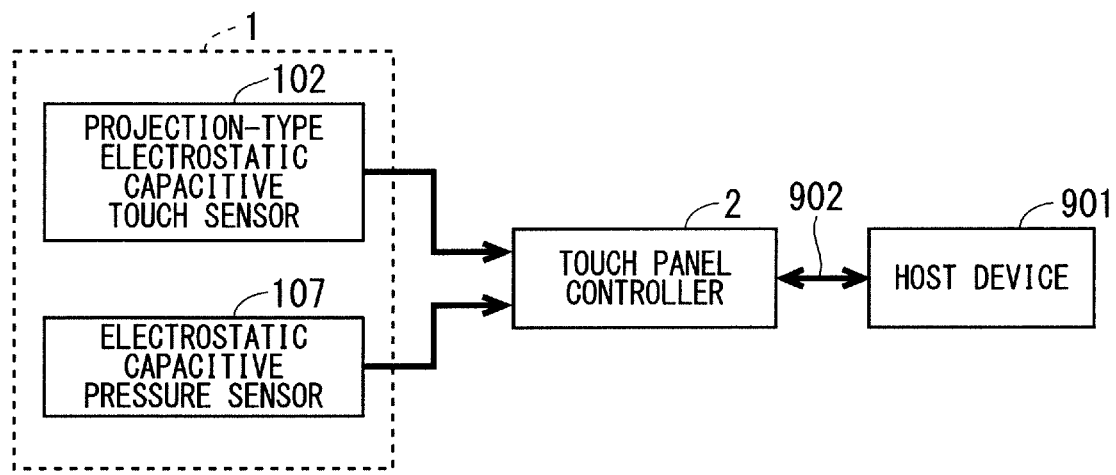

TOUCH PANEL AND DISPLAY APPARATUS

BACKGROUND OF THE INVENTION

Field of the Invention

The present invention relates to a touch panel and a display apparatus having the same.

Description of the Background Art

A touch panel that detects a touch by a pointer such as a finger and detects coordinates (touch coordinates) representing the position of the touch is widely used as an input apparatus of various types of information processing apparatuses. Especially, a touch panel attached to the screen of a display apparatus has spread as a new user interface in an information processing apparatus or the like.

In a projection-type electrostatic capacitance system that is one of electrostatic capacitance systems, a small change in electrostatic capacitance given by a human finger to a touch sensor provided in the touch panel is detected by a detection circuit, and based on the detection result, touch coordinates on the touch screen panel are calculated. According to such a projection-type electrostatic capacitance system, even when the front surface side of the touch panel in which a touch sensor is embedded is covered with a protective plate such as a glass plate having a thickness of about several mm, touch detection is possible. Such a projection-type electrostatic capacitive touch panel is superior in terms of robustness realized by providing a protective plate on the front surface, and also has advantages in that touch detection is possible even when a glove is worn, and in that it has a long lifetime because of no movable part.

A protective plate of a projection-type electrostatic capacitive touch panel is made of, for example, a transparent resin substrate such as acrylic or polycarbonate, a glass substrate, or the like. In a touch panel of this type, a structure in which the external size of the touch surface, to be touched by a pointer, is larger than the sensor surface that detects the electrostatic capacitance and in which the touch surface covers the sensor surface by overhang is often used. With such a structure, it is possible not only to provide a product having an excellent design property but also to improve the sealing property when combined with a casing of a display apparatus.

Meanwhile, a projection-type electrostatic capacitive touch panel has a waterproof property that can be used in a place where a conventional touch panel of a resistive film type or the like cannot be used, that is, a place where rain, sea water, drinks, chemicals, and the like adhere, and has a highly sensitive detection performance when a glove is worn, for example. However, when a high dielectric material such as moisture adheres to the touch surface, there is a case where a detection value reacts to the high dielectric material and it is detected that there is a touch, even though a pointer does not touch the touch panel. For this reason, there is a demand for a touch panel that stably operates without erroneously detecting a pointer due to adhesion of moisture. For example, Japanese Patent No. 5866526 (Patent Document 1) discloses a touch panel in which touch panel operation is stabilized by combining pressure detection means that detects a pressing pressure of a pointer and a detection function that is realized by a projection-type electrostatic capacitance system to thereby distinguish operation by a pointer from adhesion of moisture.

In the touch panel disclosed in Patent Document 1, a piezoelectric element or a piezoelectric film of a type different from the electrostatic capacitance type is used as pressure detection means. For this reason, a projection-type electrostatic capacitive touch panel requires a pressure detection function of a new detection system, resulting in an increase in cost. In addition, in order to detect pressure using a piezoelectric element or a piezoelectric film, it is necessary for the structure to come into contact with the sensor, and contact and non-contact are repeated each time the touch operation is performed. Therefore, there is a problem in durability.

In response to the problems as described above, the inventor has found out that it is effective to use, as pressure detection means, a pressure detection sensor capable of detecting pressure from a change in the capacitance caused by approaching of a conductor or a dielectric body to the sensor electrode, even if there is no such a contact as described above. In addition, the inventor also found out that since the pressure sensor detects electrostatic capacitance in a manner similar to an electrostatic capacitive touch panel, it is possible and easy to divert a detection circuit in combination of the pressure sensor and an electrostatic capacitive touch panel, and it is also effective from the viewpoint of cost reduction. However, when there is parasitic capacitance between a pressure sensor and a pointer or the like, the pressure sensor being capable of detecting pressure from a change in a capacitance, there is a problem that the parasitic capacitance becomes a noise component of the electrostatic capacitance detected by the pressure sensor, which adversely affects the detection performance of the pressure sensor.

SUMMARY

The present invention has been made in view of the above-described problems. An object of the present invention is to provide a technology that enables improvement in detection performance of a pressure sensor capable of detecting a pressure on a touch surface of a touch sensor panel as a change in the electrostatic capacitance.

The present invention is a touch panel that includes a touch sensor panel, a pressure sensor, a touch panel controller, a shield layer, and an insulating layer. The touch sensor panel includes an electrostatic capacitance detection sensor capable of detecting a change in the electrostatic capacitance formed between the touch sensor panel and a pointer. The pressure sensor can detect a pressure on the touch surface of the touch sensor panel as a change in the electrostatic capacitance. The touch panel controller performs control to generate information relating to a touch by a pointer to the touch surface, based on a change in the electrostatic capacitance detected by the electrostatic capacitance detection sensor and a change in the electrostatic capacitance detected by the pressure sensor. The shield layer includes a conductive material disposed between the touch surface and the pressure sensor so as to be overlapped with at least a part of the pressure sensor as viewed from the touch surface. The insulating layer electrically insulates the shield layer from the pressure sensor.

It is possible to improve the detection performance of a pressure sensor capable of detecting a pressure on the touch surface of the touch sensor panel as a change in the electrostatic capacitance.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating a configuration of a touch panel according to a first preferred embodiment;

DESCRIPTION OF THE PREFERRED EMBODIMENTS

Figure 2:
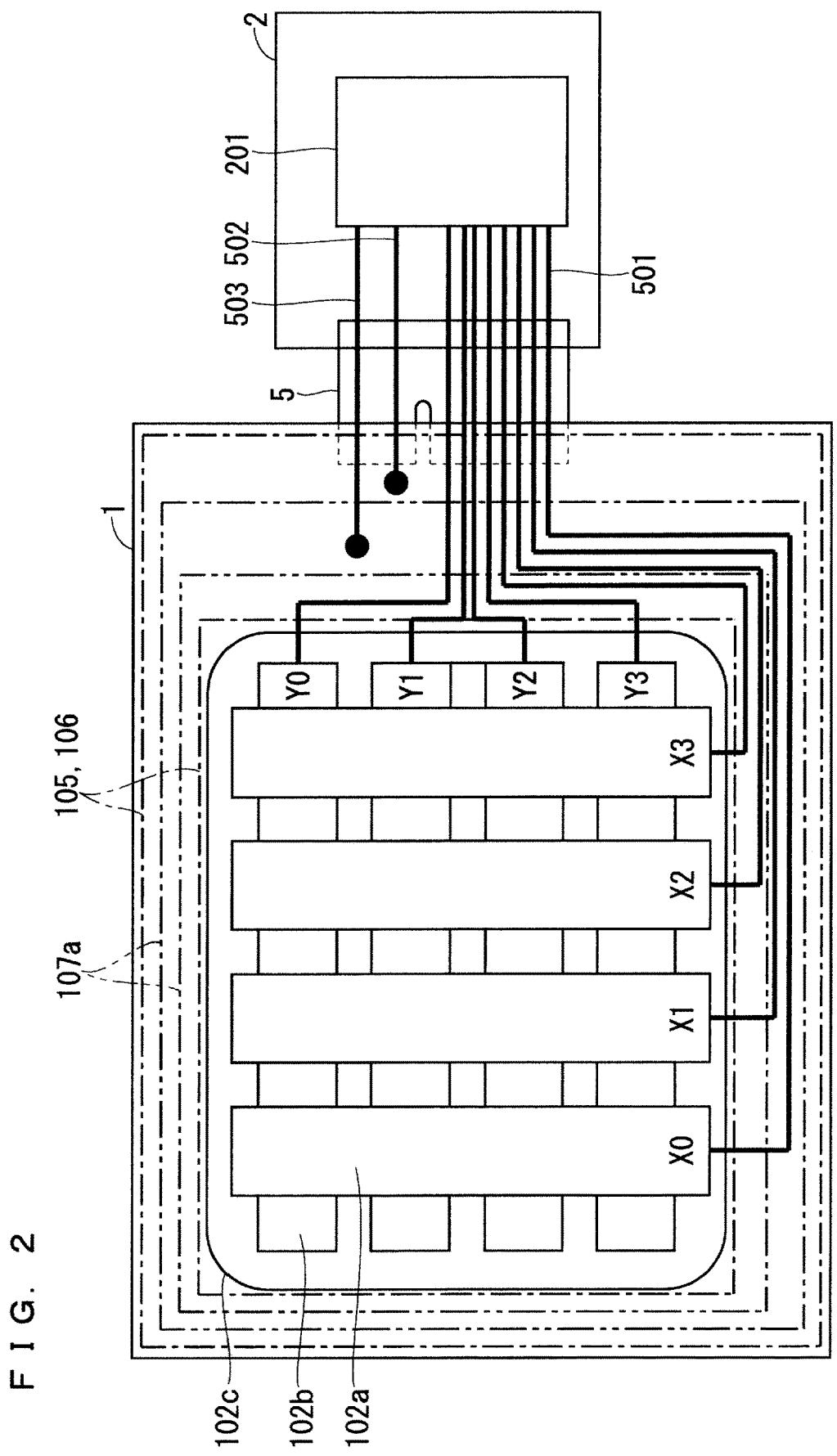
FIG. 2 is a plan view illustrating the configuration of the touch panel according to the first preferred embodiment.

Preferred embodiments of the present invention will be described with reference to the drawings. In the following description, in order to avoid redundant explanation, the same reference numerals are given to the constituent elements having the same or corresponding functions in each figure.

First Preferred Embodiment

FIG. 1 is a block diagram illustrating a configuration of a touch panel (touch panel apparatus) according to a first preferred embodiment of the present invention. As illustrated in FIG. 1, the touch panel includes a touch sensor panel 1 and a touch panel controller 2, and is connected to a host device 901.

The touch sensor panel 1 includes a projection-type electrostatic capacitive touch sensor 102 and an electrostatic capacitive pressure sensor 107. The touch sensor 102 is an electrostatic capacitance detection sensor that forms electrostatic capacitance between it and a pointer such as a finger and is able to detect a change in the electrostatic capacitance.

The pressure sensor 107 is a sensor that is able to detect pressure on the touch surface of the touch sensor panel 1, that is, pressure from the pointer to the touch surface, for example, as a change in the electrostatic capacitance. In the description provided below, the touch surface of the touch sensor panel 1 is simply referred to as a "touch surface".

In FIG. 1, the touch sensor panel 1 is configured to include a pressure sensor 107. In other words, the pressure sensor 107 is configured solely of the components of the touch sensor panel 1. However, the pressure sensor 107 according to the first preferred embodiment is not limited thereto. For example, the pressure sensor 107 may not be included in the touch sensor panel 1, or may be configured to extend over components other than the touch sensor panel 1 as described below.

The touch panel controller 2 detects (calculates) touch coordinates representing the position at which the pointer touches the touch surface, based on a change in the electrostatic capacitance detected by the touch sensor 102, and detects the pressing pressure of the pointer based on a change in the electrostatic capacitance detected by the pressure sensor 107. Then, the touch panel controller 2 performs control to generate information including the detection result and presence/absence of a touch as touch information regarding the touch of the pointer to the touch surface, and control to output the generated touch information. The control to generate the touch information includes generating the touch information and stopping the generation of the touch information, and the control to output the touch information includes outputting the touch information and stopping the output of the touch information.

The touch panel controller 2 is connected to the host device 901 via a connection element 902 such as a connector and a cable, and is able to output the generated touch information and the like to the host device 901. For communication between the touch panel controller 2 and the host device 901, a universal serial bus (USB), an inter-integrated circuit (I2C), a universal asynchronous receiver transmitter (UART), and the like are used, for example.

Figure 3:
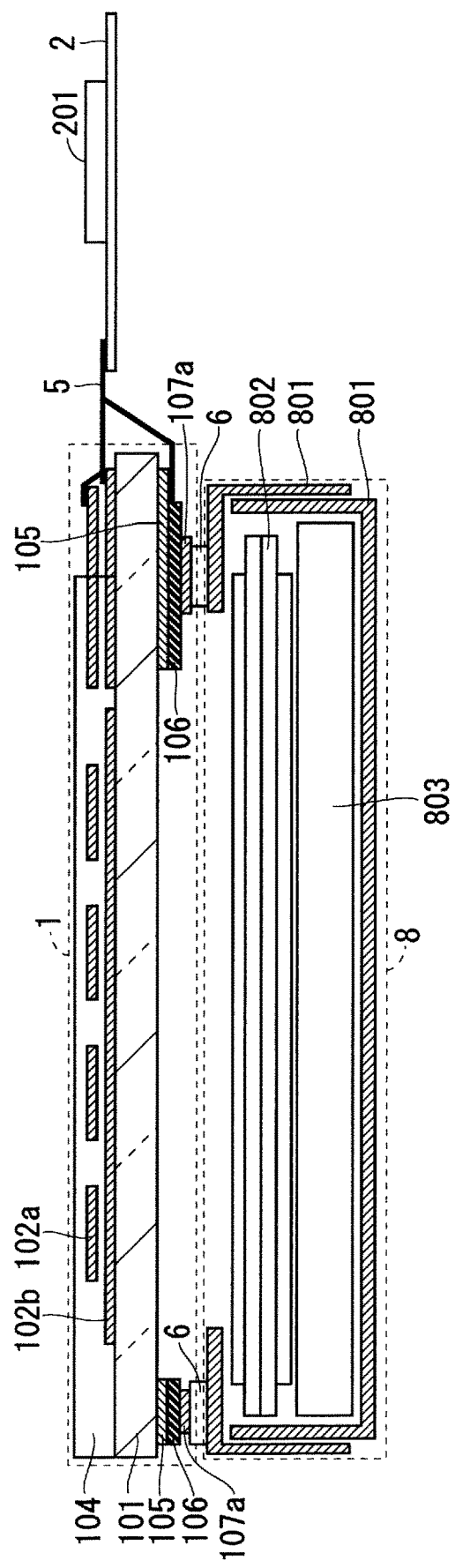
FIG. 3 is a cross-sectional view illustrating a configuration of the touch panel according to the first preferred embodiment.

FIG. 2 is a plan view of the configuration of the touch panel according to the first preferred embodiment as viewed from the touch surface, and FIG. 3 is a cross-sectional view of the configuration. FIGS. 2 and 3 illustrate not only the touch sensor panel 1 and the touch panel controller 2, but also a flexible substrate 5 (hereinafter referred to as "FPC 5") for electrically connecting the touch sensor panel 1 and the touch panel controller 2. FIG. 3 also illustrates a liquid crystal module 8 included in a liquid crystal display (LCD) that is a display apparatus in which the touch sensor panel 1 is attached to the display surface side of the display apparatus and integrated.

The touch panel illustrated in FIGS. 2 and 3 includes the FPC 5, a shield layer 105, an insulating layer 106, and a pressure sensor electrode 107a, in addition to the touch sensor panel 1 and the touch panel controller 2. The touch sensor panel 1 includes a transparent substrate 101, a plurality of X sensors 102a, a plurality of Y sensors 102b, and an insulating layer 104. The touch panel controller 2 includes an electrostatic capacitance detection circuit 201.

Among these configurations, the X sensors 102a and the Y sensors 102b constitute the touch sensor 102 of FIG. 1. As described later, the pressure sensor electrode 107a and the metal frame 801 of the liquid crystal module 8 constitute the pressure sensor 107 of FIG. 1.

The touch sensor panel 1 incorporates therein the X sensors 102a and the Y sensors 102b as matrix type sensors. The touch sensor panel 1 of FIG. 2 includes, as sensors for detecting a touch to the touch surface, the X sensors 102a extending in the vertical direction and arranged in the horizontal direction, and the Y sensors 102b extending in the horizontal direction and arranged in the vertical direction. That is, the X sensors 102a and the Y sensors 102b are disposed as wirings orthogonal to each other.

In FIGS. 2 and 3, in order to simplify the drawings, the number of X sensors 102a and the number of Y sensors 102b are reduced. Accordingly, four X sensors 102a denoted by X0 to X3 and four Y sensors 102b denoted by Y0 to Y3 are illustrated. Hereinafter, in the case where the X sensor 102a and the Y sensor 102b are not distinguished, they are described as "sensor 102a" and "sensor 102b", respectively.

As illustrated in FIG. 3, the sensors 102a, 102b are disposed on the touch surface side of the transparent substrate 101 such as a film, glass, or the like, in a state where each sensor is covered with the insulating layer 104. Between each of the sensors 102a and 102b and a counter electrode in the liquid crystal module 8, self capacitance Cg that is parasitic capacitance is formed, and between the X sensor 102a and the Y sensor 102b, mutual capacitance Cm is formed.

In the plan view of FIG. 2, an area of the touch surface that is detectable by the touch sensor 102 including the sensors 102a and 102b will be described below as a "detectable region 102c". In an outer peripheral area surrounding the detectable region 102c, the pressure sensor electrode 107a indicated by a two-dot chain line and the shield layer 105 and the insulating layer 106 each indicated by a one-dot chain line are provided.

In the cross-sectional view of FIG. 3, the shield layer 105 is disposed on the surface of the transparent substrate 101 on the side opposite to the touch surface. When viewed from the surface on the side opposite to the touch surface, the insulating layer 106 is disposed on the shield layer 105, and the pressure sensor electrode 107a is disposed on the insulating layer 106.

The shield layer 105 is a shield electrode including a conductive material, for example. The shield layer 105 is disposed between the touch surface and the pressure sensor 107 while being overlapped with at least a part of the pressure sensor 107 as viewed from the touch surface. In the example of FIGS. 2 and 3, the area of the shield layer 105 is larger than the area of the pressure sensor electrode 107a constituting the pressure sensor 107, and is smaller than the metal frame 801 constituting the pressure sensor 107. Therefore, the shield layer 105 is overlapped with a part of the pressure sensor 107. In the case where the pressure sensor 107 is configured of a component whose area is smaller than the area of the shield layer 105, instead of the metal frame 801, the shield layer 105 is disposed to be overlapped with the entire pressure sensor 107.

Now, as will be described later, the shield layer 105 is connected, though the electrostatic capacitance detection circuit 201 of the touch panel controller 2, to a ground potential (GND), a DC power supply, or an AC power supply that outputs an AC signal having a same phase as that of an excitation signal for capacity detection. Thus the impedance of the shield layer 105 is reduced. The shield layer 105 configured in this manner is able to suppress or block an electric line of force and hence parasitic capacitance (electrostatic capacitance) formed between the pressure sensor 107 and the dielectric body outside the touch panel such as a pointer and a high dielectric material. This will be explained in detail below.

The FPC 5 electrically connects the sensors 102a, 102b on the touch sensor panel 1 side, the shield layer 105, and the pressure sensor electrode 107a, to the electrostatic capacitance detection circuit 201 on the touch panel controller 2 side. For example, the FPC 5 is crimp-connected to the components on the touch sensor panel 1 side by using an anisotropic conductive film (ACF), and is connected to the components on the touch panel controller 2 side by using a connector or the like. Through this connection, the wirings 501, 502, 503 are formed.

The electrostatic capacitance detection circuit 201 is connected to the sensors 102a and 102b via the wiring 501, connected to the shield layer 105 via the wiring 502, and connected to the pressure sensor electrode 107a via the wiring 503. The electrostatic capacitance detection circuit 201 has a control arithmetic circuit that calculates touch coordinates and the like outputted to the host device 901 from detection values of the touch sensor 102 or the like including the sensors 102a, 102b. The control arithmetic circuit includes a memory and an arithmetic circuit, for measuring the electrostatic capacitance. The memory and the arithmetic circuit are configured of an excitation signal generating circuit, an integrating amplifier, a sample & hold circuit, an AD converter, and the like.

On the opposite side of the touch surface of the touch sensor panel 1, a liquid crystal module 8 for displaying an image is disposed. The liquid crystal module 8 includes a liquid crystal panel 802, a backlight 803 including a light emitting diode (LED), a light guide plate, and an optical film, and the metal frame 801 covering them.

The liquid crystal module 8 is bonded to the touch sensor panel 1 by a double-sided tape 6. The double-sided tape 6 has a relatively high cushioning property, and can be elastically deformed, by the pressure on the touch surface, to such a degree that the gap between the pressure sensor electrode 107a and the metal frame 801 can sufficiently vary.

Figure 4:
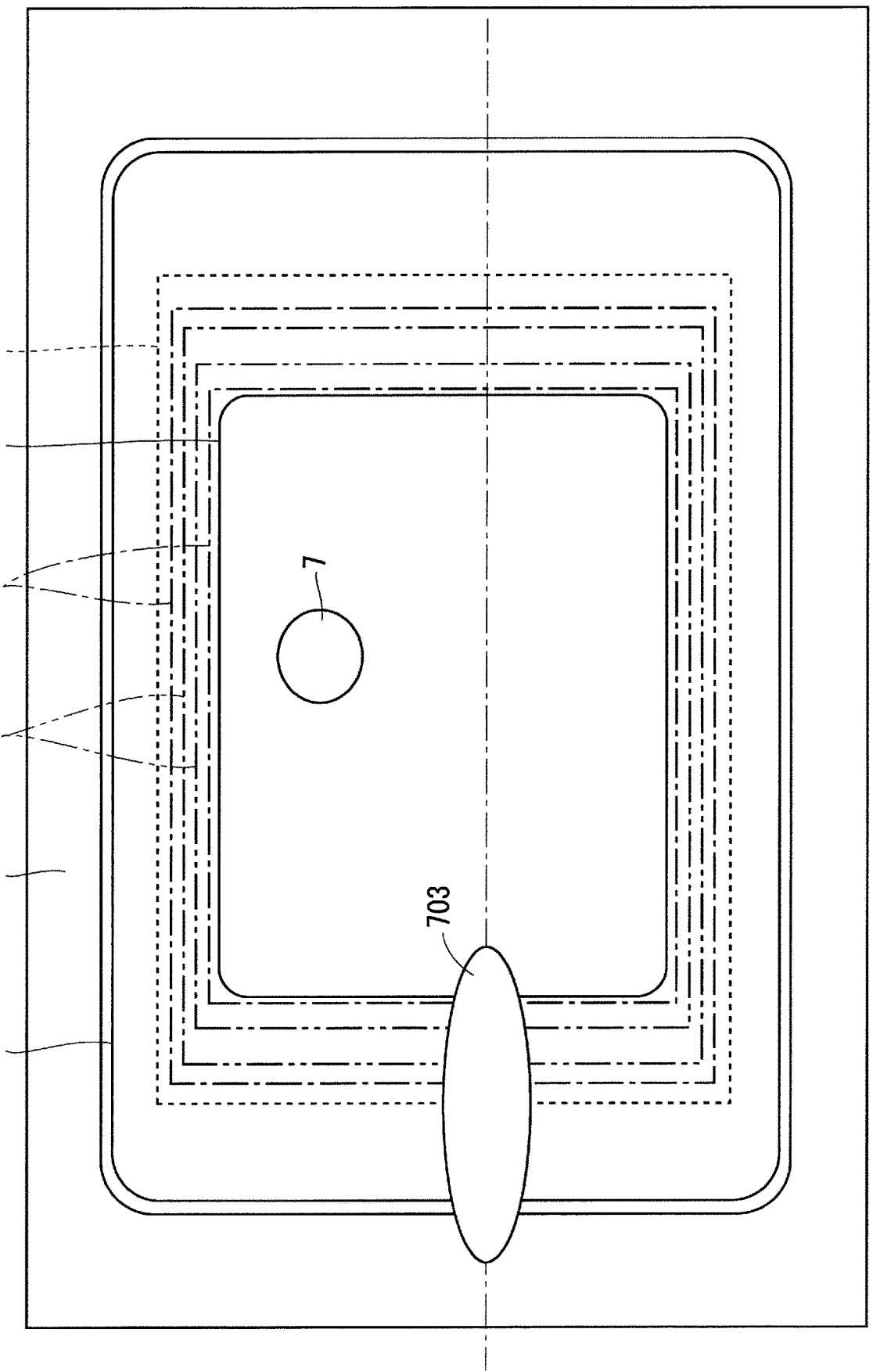
FIG. 4 is a plan view illustrating an exemplary structure to which the touch panel according to the first preferred embodiment is applied.
Figure 5:
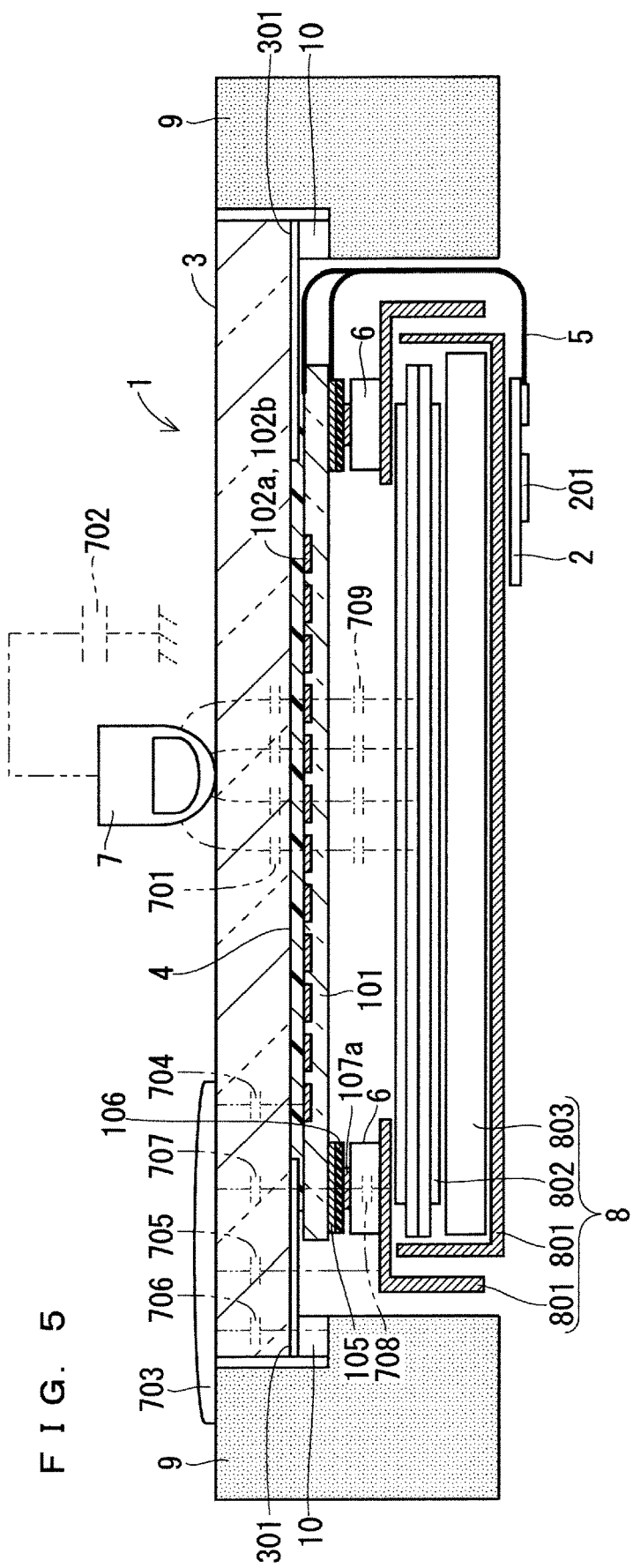
FIG. 5 is a cross-sectional view illustrating an exemplary structure to which the touch panel according to the first preferred embodiment is applied.

FIG. 4 is a plan view illustrating an out-cell structure to which the touch panel according to the first preferred embodiment is applied, and FIG. 5 is a cross-sectional view of the structure thereof. FIG. 4 illustrates a protective plate 3, an optically clear adhesive (OCA) 4, an apparatus casing 9, and a double-sided tape 10, in addition to the configurations described in FIGS. 2 and 3.

The touch sensor panel 1 includes the protective plate 3 and the OCA 4, in addition to the structures of the sensors 102a, 102b, the transparent substrate 101, and the like.

The protective plate 3 is a transparent plate for protecting the structure, and the surface of the protective plate 3 is used as a touch surface. It is noted that a decorative member 301 having a design property formed by printing or the like is formed in a region other than the region where the sensors 102a, 102b are provided to the surface on the side opposite to the touch surface of the protective plate 3, as viewed from the touch surface.

The OCA 4 is used to bond the protective plate 3 and the transparent substrate 101 together. The apparatus casing 9 covers side portions of the protective plate 3, the transparent substrate 101, the liquid crystal module 8, and the like. The double-sided tape 10 is a tape that can be elastically deformed like the double-sided tape 6 described above, and is used to bond the surface on the opposite side of the touch surface of the protective plate 3 and the apparatus casing 9.

Now, FIGS. 4 and 5 illustrate a state where the pointer 7 such as a finger is touching the touch surface. FIGS. 4 and 5 also illustrate a state where a high dielectric material 703 such as water, salt water, drinks, chemicals, etc. adheres to the outer peripheral portion of the touch surface, more specifically, a portion from the apparatus casing 9 to the sensors 102a and 102b on the end side.

In addition, FIG. 5 illustrates electrostatic capacitance 701 formed between the pointer 7 and the sensors 102a, 102b, human body capacitance 702, coupling capacitance 704 formed between the high dielectric material 703 and the sensors 102a, 102b, coupling capacitance 705 formed between the high dielectric material 703 and the metal frame 801, coupling capacitance 706 formed between the high dielectric material 703 and the apparatus casing 9, coupling capacitance 707 formed between the high dielectric material 703 and the shield layer 105, and coupling capacitance 708 formed between the pressure sensor electrode 107a and the metal frame 801.

Here, the coupling capacitance 708 is pressure sensor capacitance to be detected by the pressure sensor 107 including the pressure sensor electrode 107a and the metal frame 801. This will be described below in detail.

Figure 6:
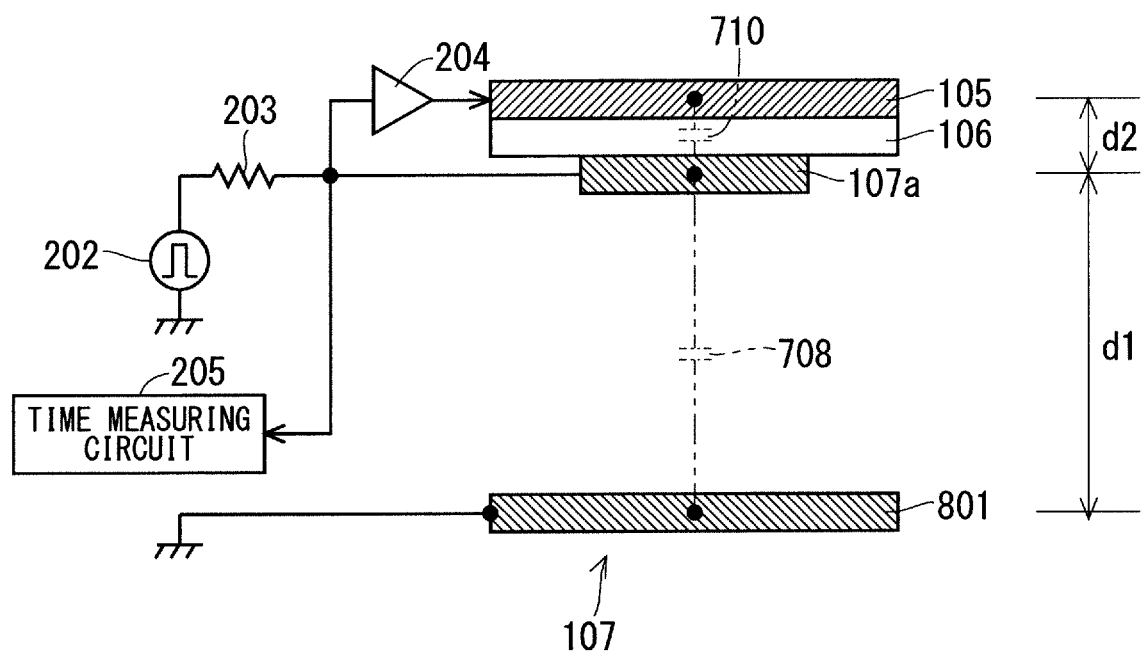
FIG. 6 is a diagram illustrating an exemplary circuit of a pressure sensor according to the first preferred embodiment.

FIG. 6 is a diagram illustrating an exemplary circuit of the pressure sensor 107 that detects pressure applied to the touch surface. In the pressure sensor 107, the coupling capacitance 708 is formed in a gap d1 between the pressure sensor electrode 107a and the metal frame 801, and the metal frame 801 is electrically connected to the GND.

The electrostatic capacitance detection circuit 201 in FIGS. 2 and 5 includes an excitation signal circuit 202 and a time measuring circuit 205. The excitation signal circuit 202 is electrically connected to the pressure sensor electrode 107a via a charging resistor 203. The excitation signal circuit 202 is also electrically connected to the shield layer 105 via the charging resistor 203 and an amplifier circuit 204. The time measuring circuit 205 is electrically connected to the charging resistor 203, the amplifier circuit 204, and the pressure sensor electrode 107a.

Through the connection described above, a relaxation oscillation circuit is formed. In this relaxation oscillation circuit, when the excitation signal circuit 202 charges the coupling capacitance 708 via the charging resistor 203, a voltage waveform in the charging becomes a waveform having the product of the charging resistor 203 and the coupling capacitance (pressure sensor capacitance) 708 as a time constant. Therefore, if the time between the discharge time point and a time point at which the voltage at the discharge time point is charged to a constant voltage is measured by the time measuring circuit 205, the change amount of the coupling capacitance 708 can be obtained from the change amount of the time. Therefore fluctuation of the gap d1 can be obtained from the change amount of the coupling capacitance 708 obtained. In the relaxation oscillation circuit, it is possible to detect a change in the coupling capacitance 708 based on the variation of the gap d1 as a time, as described above. Since the amount of change in the time to be measured is very small, it is preferable to measure the time at a plurality of timings and to perform an averaging process on a plurality of times obtained thereby.

On the pressure sensor electrode 107a in FIG. 6, the shield layer 105 is provided via the insulating layer 106, and the shield layer 105 is patterned so as to cover the pressure sensor electrode 107a. Here, if the shield layer 105 is in a high impedance state such as a floating state, the capacitance measured by the time measuring circuit 205 includes not only the coupling capacitance (pressure sensor capacitance) 708 but also the coupling capacitance 707 (FIG. 5) formed between the high dielectric material 703 or the like and the shield layer 105. Since the coupling capacitance 707 is not the capacitance caused by the pressure applied to the touch surface, it becomes a noise component.

As will be described in detail later, if the shield layer 105 is directly or indirectly connected to the GND without being allowed to be in a high impedance state, the noise component due to the coupling capacitance 707 can be reduced. However, even when the shield layer 105 is connected to the GND, the capacitance measured by the time measuring circuit 205 does not become the coupling capacitance (pressure sensor capacitance) 708 but becomes the sum of the coupling capacitance (pressure sensor capacitance) 708 and the parasitic capacitance 710 (FIG. 6) between the pressure sensor electrode 107a and the shield layer 105.

Here, if a distance d2 between the pressure sensor electrode 107a and the shield layer 105 is smaller relative to the gap d1, or when the dielectric constant of the insulating layer 106 is large, for example, the parasitic capacitance 710 is larger relative to the coupling capacitance 708. In that case, it becomes necessary to increase the measurement range, or if the resolution is the same, a problem such as relatively low sensitivity occurs. In order to reduce this problem and make it easy to measure the coupling capacitance (pressure sensor capacitance) 708, that is, to measure a change in the coupling capacitance 708 with high resolution in a short time, it is desirable that the parasitic capacitance 710 is small.

Therefore, the preferred touch panel according to the first preferred embodiment is configured such that a voltage waveform that is the same as the voltage waveform applied to the pressure sensor electrode 107a is made to have low impedance by the amplifier circuit 204 and is applied to the shield layer 105 so that the parasitic capacitance 710 becomes small. According to such a configuration, since a potential difference does not substantially occur between the shield layer 105 and the pressure sensor 107, the parasitic capacitance 710 can be neglected, and only the coupling capacitance (pressure sensor capacitance) 708 can be measured.

In the above description, the relaxation oscillation method has been described as an example of a method for detecting the coupling capacitance (pressure sensor capacitance) 708. However, any other detection method may be used as long as it can detect a change in the capacitance according to the pressure. In addition, when the distance d2 is equal to or greater than the gap d1, not only detection by the self capacitance method but also detection of the mutual capacitance method in which excitation of the shield layer 105 and detection (reception) from the pressure sensor 107 are performed may also be performed.

Figure 7:
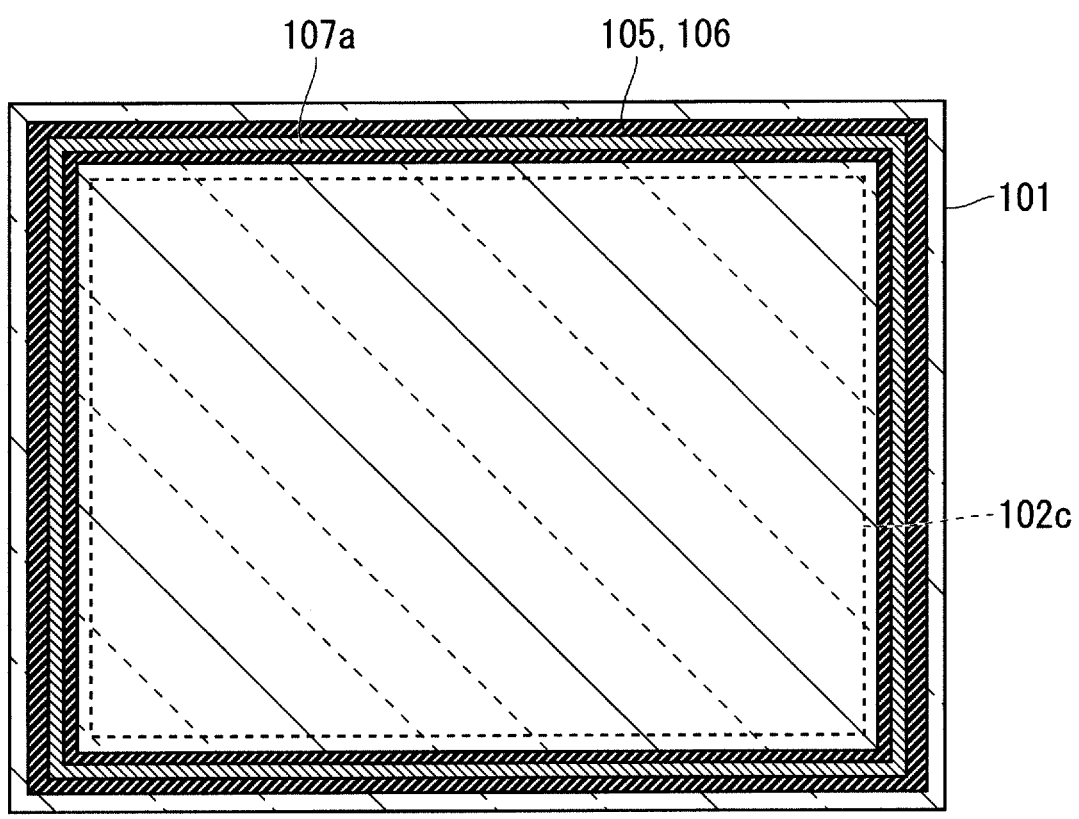
FIG. 7 is a plan view illustrating an exemplary structure to which the touch panel according to the first preferred embodiment is applied.

FIG. 7 is a diagram illustrating an example of a pattern layout of the shield layer 105, the insulating layer 106, and the pressure sensor electrode 107a disposed on the touch sensor panel 1, as viewed from a surface of the opposite side of the touch surface. The pattern of the pressure sensor electrode 107a is determined in consideration of the number of detections, the sensor area, the sensor resistance value, the optical performance of the touch panel (transmittance, reflectance, visual aspect such as pattern appearance), and the like. Variations of the patterns will be described in detail in Modification 1 described below.

Figure 8:
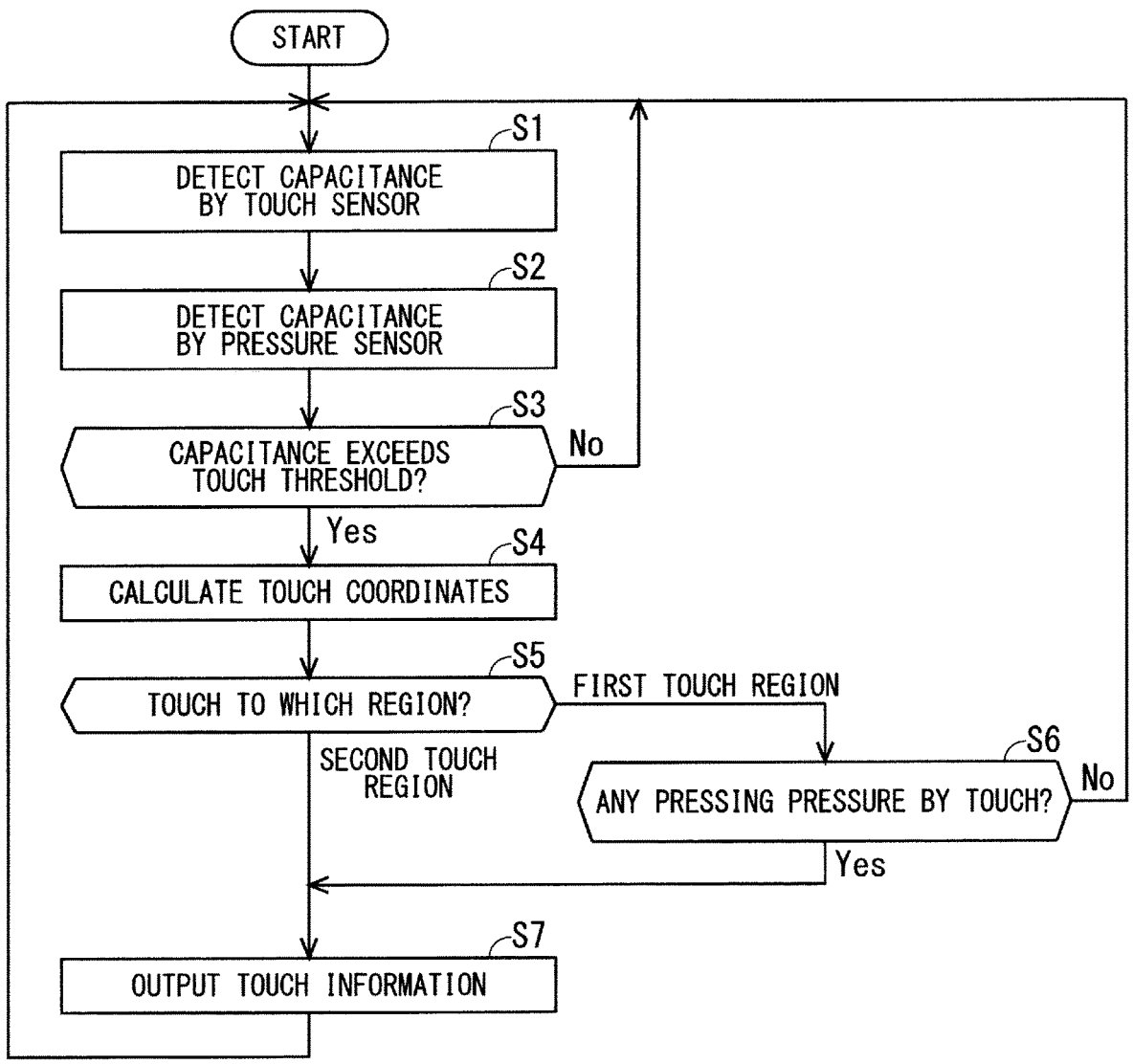
FIG. 8 is a flowchart illustrating an operation of the touch panel according to the first exemplary embodiment.

FIG. 8 is a flowchart illustrating an operation of the touch panel according to the first preferred embodiment. In the flowchart of FIG. 8, loop processing from the process of step S1 to the process of again step S1 through the process of step S3, step S6 or step S7 is performed. Processes not directly related to the description of the first preferred embodiment, such as a baseline updating process, are not illustrated.

In step S1, the touch sensor 102 of the touch sensor panel 1 detects the electrostatic capacitance 701 formed between the touch sensor 102 and the pointer.

In step S2, the pressure sensor 107 detects coupling capacitance (pressure sensor capacitance) 708 formed between the pressure sensor electrode 107a and the metal frame 801, corresponding to the pressing pressure of the pointer.

In step S3, the electrostatic capacitance detection circuit 201 determines whether or not the electrostatic capacitance 701 detected in step S1 exceeds a touch threshold for determining presence/absence of a touch. When it is determined that the electrostatic capacitance 701 is equal to or less than the touch threshold, the electrostatic capacitance detection circuit 201 determines that there is no touch, and performs processing (not illustrated) to generate the latest baseline value from the electrostatic capacitance value detected in steps S1 and S2 and the baseline value. Thereafter, the processing returns to step S1. If it is determined that the electrostatic capacitance 701 exceeds the touch threshold, the electrostatic capacitance detection circuit 201 determines that there is a touch, and the processing proceeds to step S4.

In step S4, the electrostatic capacitance detection circuit 201 calculates the touch coordinates of the touch determined to be made.

Figure 9:
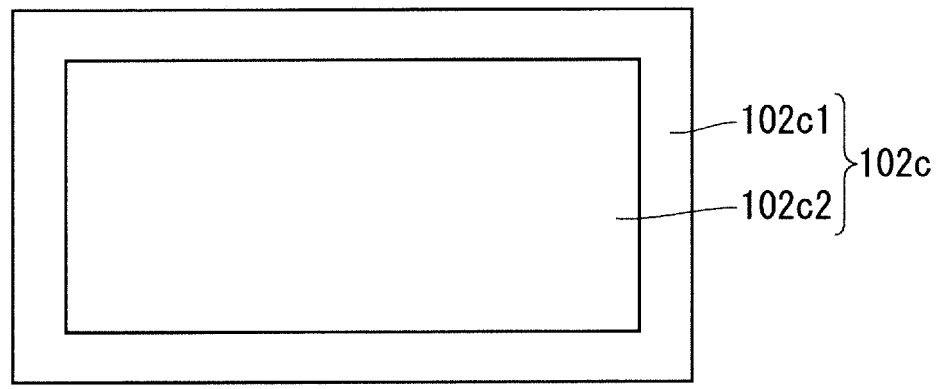
FIG. 9 is a plan view illustrating a detectable region according to the first preferred embodiment.

Here, in the first preferred embodiment, the detectable region 102c of FIG. 2 that is detectable by the touch sensor 102 is divided into two regions. FIG. 9 is a plan view illustrating an example of the detectable region 102c according to the first preferred embodiment. The detectable region 102c in FIG. 9 includes a first touch region 102c1 defined at an end of the detectable region 102c and a second touch region 102c2 that is a region other than the first touch region 102c1 of the detectable region 102c.

The first touch region 102c1 is defined as a range in which a high dielectric material 703 such as water easily adheres and the coupling capacitance 705, 706 between the high dielectric material 703 and the metal frame 801 or the apparatus casing 9 is easily detected. That is, the first touch region 102c1 is defined by the positions of the metal frame 801 and the apparatus casing 9. Note that several sensors 102a, 102b that are several sensors from the outer circumference of the detectable region 102c are easily affected by the high dielectric material 703. For this reason, when the width of each of the sensors 102a, 102b is 5 mm, for example, it is preferable that a region inward from the outer circumference of the detectable region 102c by the width of 15 mm for the three sensors 102a, 102b is defined as the first touch region 102c1. Variations of the first touch region 102c1 and the second touch region 102c2 will be described in detail in Modification 2 to be described below.

In step S5 of FIG. 8, the electrostatic capacitance detection circuit 201 performs area determination for determining whether the calculated touch coordinates are coordinates of the first touch region 102c or coordinates of the second touch region 102c2. That is, the electrostatic capacitance detection circuit 201 determines that which of the first touch region 102c1 and the second touch region 102c2 is touched by the touch detected by the touch sensor 102.

When it is determined that the calculated touch coordinates are the coordinates of the first touch region 102c1, it is determined that the possibility of erroneous detection due to water adhesion is high, and the processing proceeds to step S6. When it is determined that the calculated touch coordinates are the coordinates of the second touch region 102c2, it is determined that the possibility of erroneous detection due to water adhesion is low, and the processing proceeds to step S7. If touches are a plurality of points are detected by multi-touching and there are one or more coordinates of the first touch region 102c1 among the plurality of touch points, the processing may proceed to step S6.

In step S6, the electrostatic capacitance detection circuit 201 determines whether or not there is a pressing pressure by a touch based on the coupling capacitance (pressure sensor capacitance) 708 detected in step S2. When it is determined that there is a pressing pressure caused by a touch, it is determined that the possibility of erroneous detection due to water adhesion is low, and the processing proceeds to step S7. When it is determined that there is no pressing pressure caused by a touch, it is determined that the possibility of erroneous detection due to water adhesion is high. Therefore, the processing does not proceed to step S7, and returns to step S1.

In step S7, the electrostatic capacitance detection circuit 201 outputs touch information including touch coordinates and the like to the host device 901 of FIG. 1. As a result, when it is determined that the possibility of erroneous detection due to water adhesion is low, the touch information is output to the host device 901. Thereafter, the processing returns to step S1.

As described above, in the first preferred embodiment, the touch panel controller 2 including the electrostatic capacitance detection circuit 201 performs control to generate coordinates of a position touched by the pointer on the first touch region 102c1, based on a change in the electrostatic capacitance detected by the touch sensor 102 and a change in the electrostatic capacitance detected by the pressure sensor 107. In addition, the touch panel controller 2 performs control to generate coordinates of a position touched by the pointer on the second touch region 102c2, based on a change in the electrostatic capacitance detected by the touch sensor 102.

Next, a voltage applied to the shield layer 105 at the time of detection by the touch sensor 102 at step S1 and at the time of detection by the pressure sensor 107 at step S2 will be described.

Figure 10:
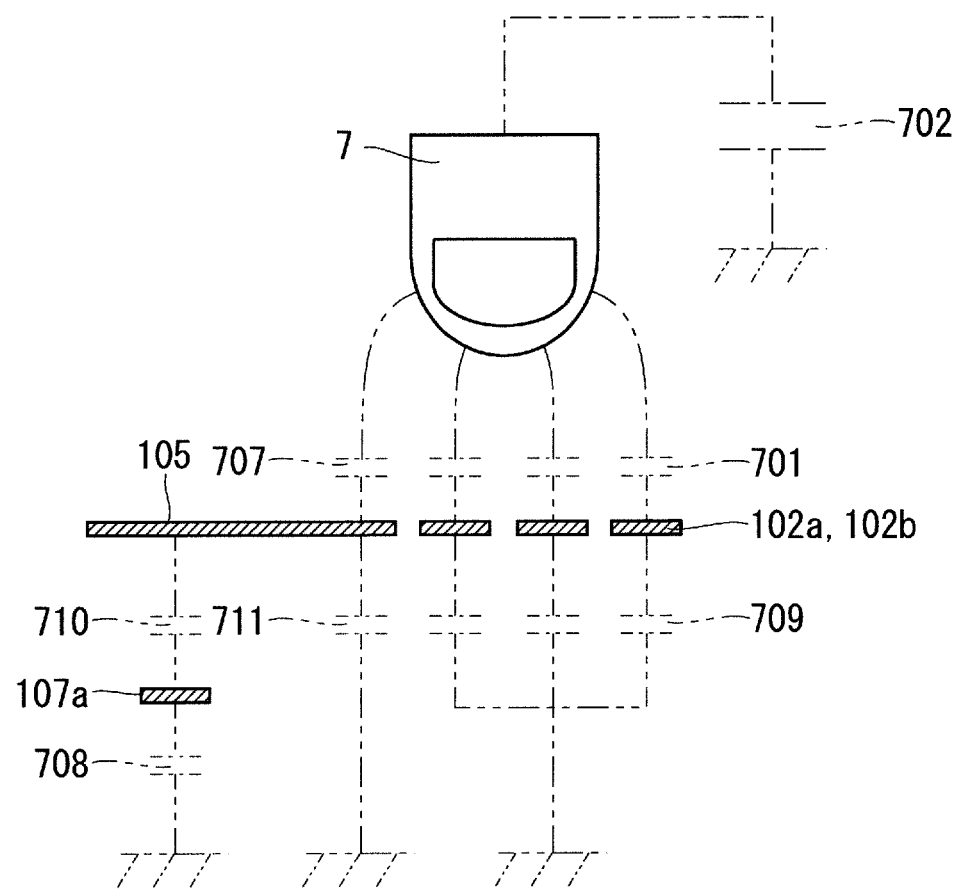
FIG. 10 is an illustration for explaining voltage application on a related touch panel.
Figure 11:
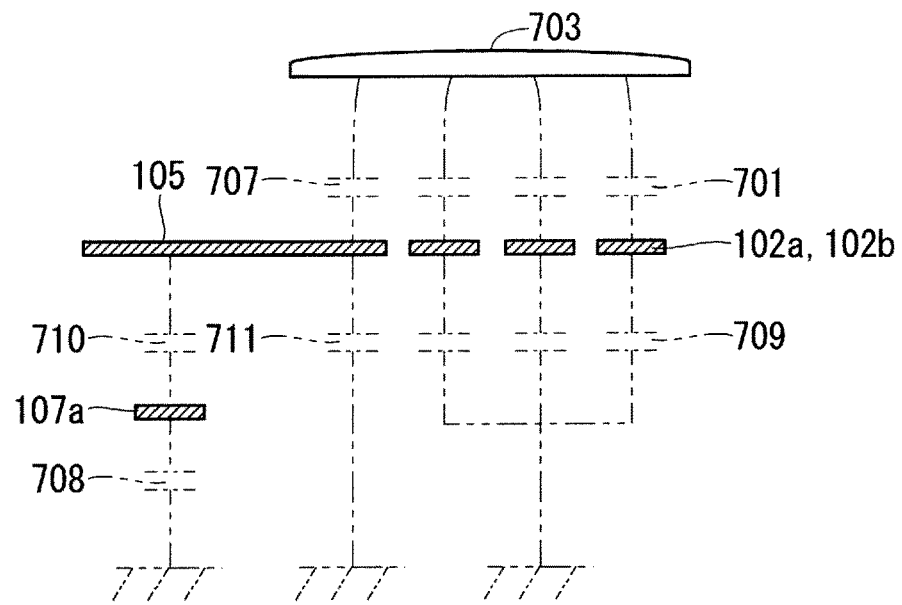
FIG. 11 is an illustration for explaining voltage application on a related touch panel.
Figure 12:
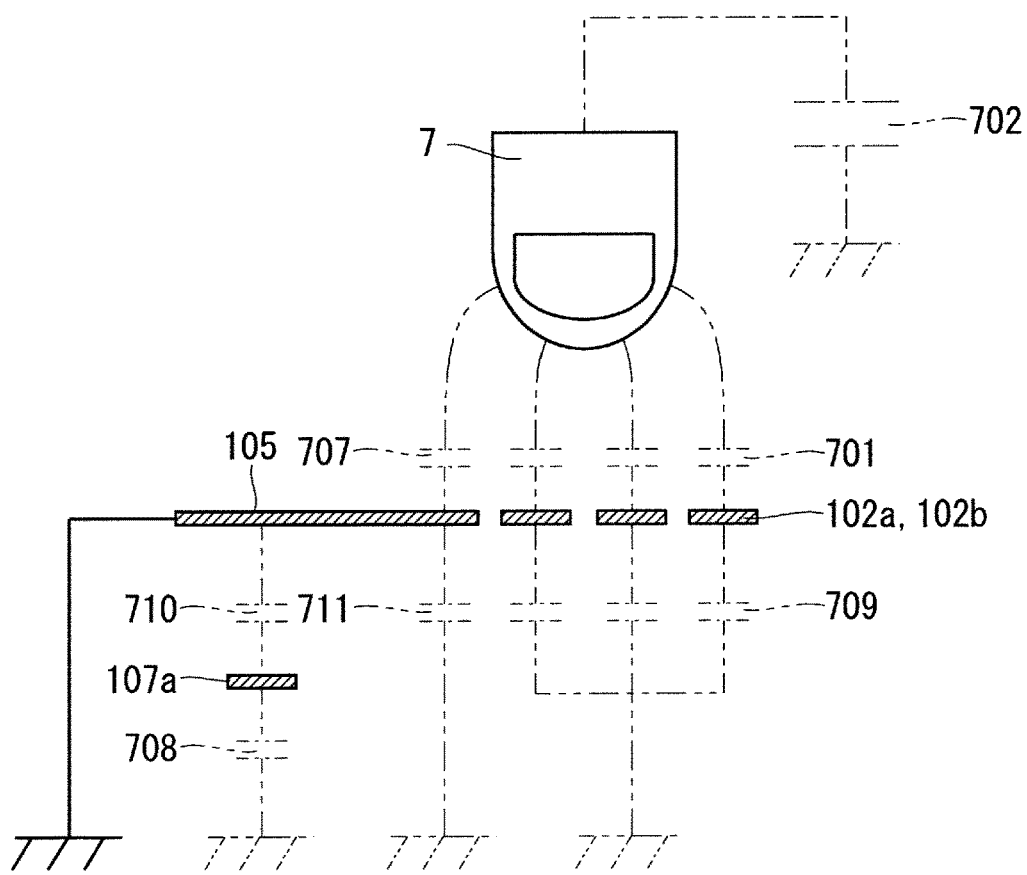
FIGS. 12 to 15 are illustrations each explaining voltage application on the touch panel according to the first preferred embodiment.
Figure 13:
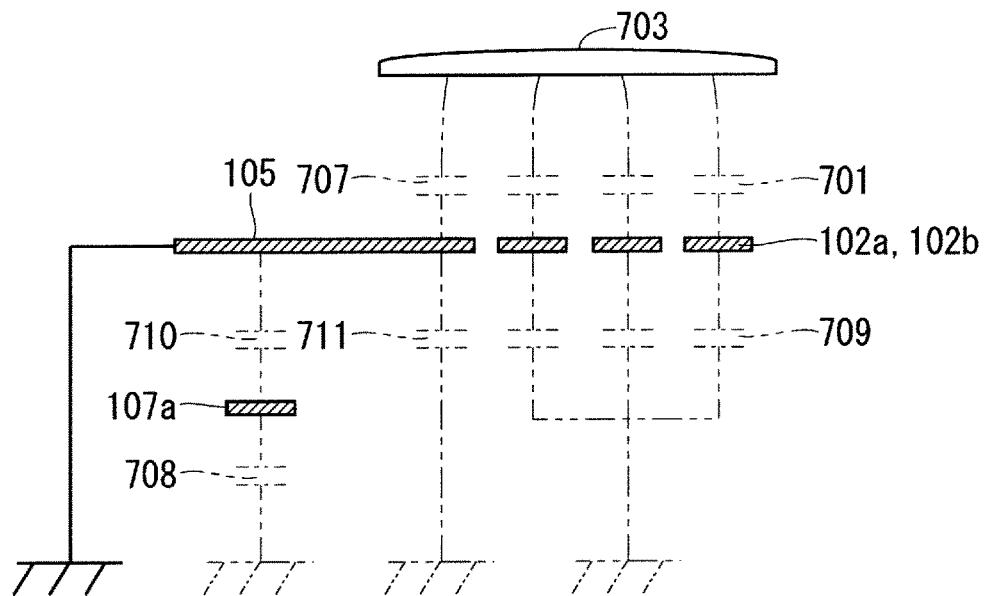
Figure 14:
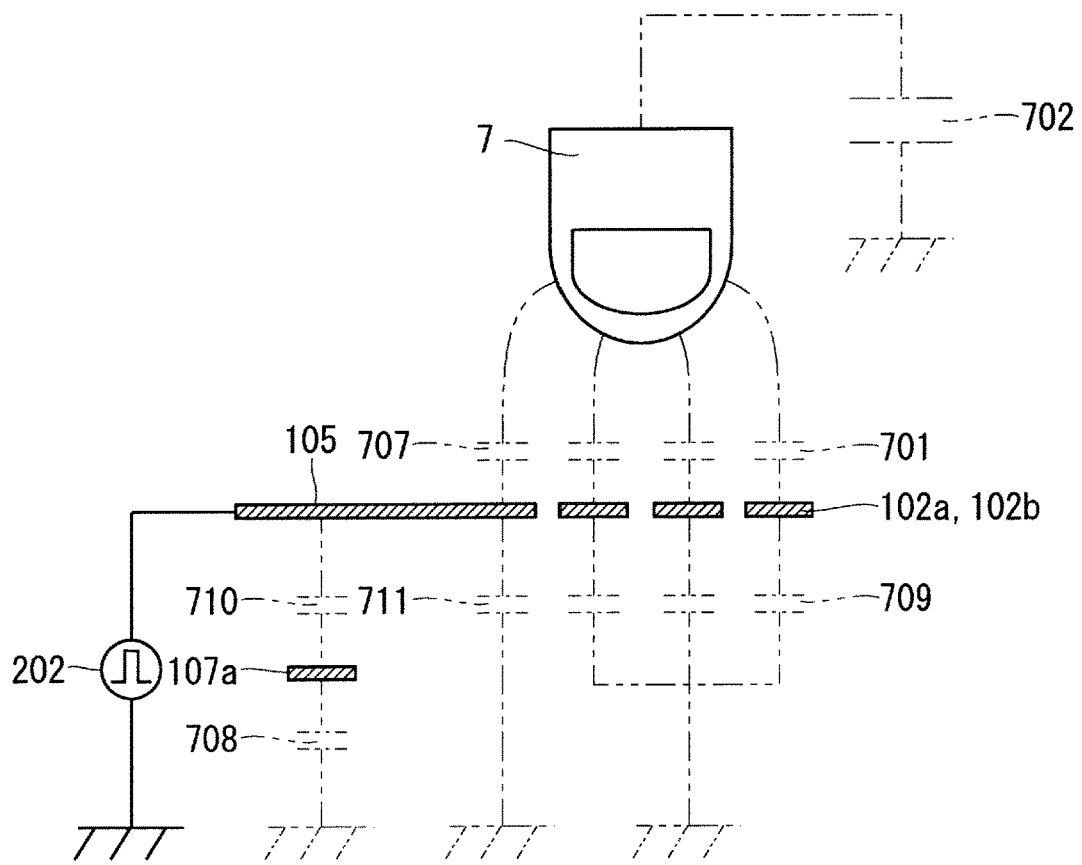
Figure 15:
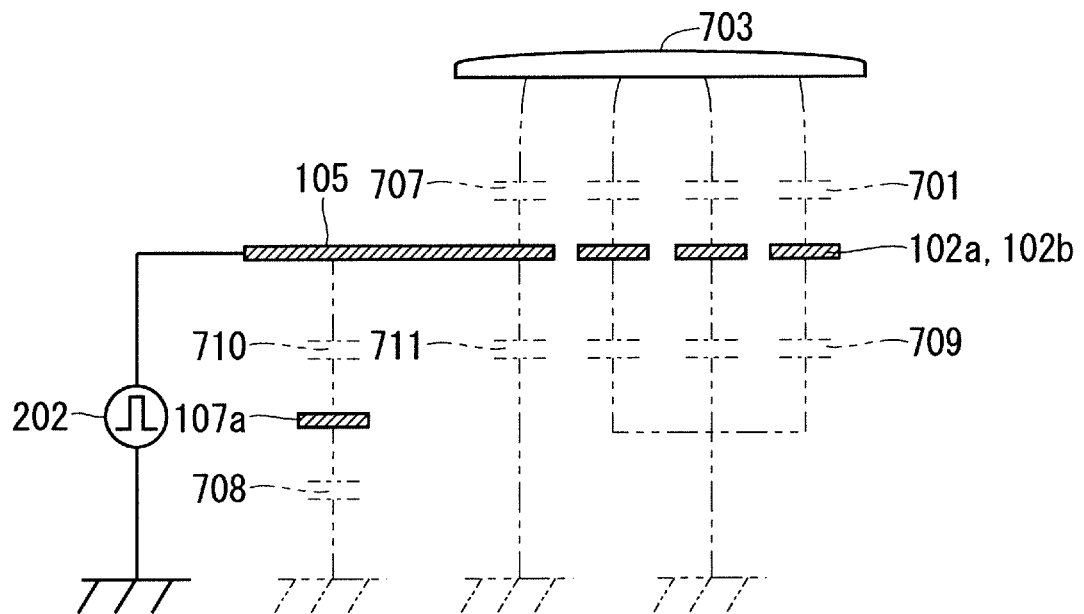

FIGS. 10 and 11 are diagrams for explaining voltage application on a related touch panel relating to the touch panel according to the first preferred embodiment. FIGS. 12 and 13 are diagrams for explaining voltage application on the touch panel according to the first preferred embodiment. FIGS. 14 and 15 are diagrams for explaining voltage application on a preferred touch panel according to the first preferred embodiment. In FIGS. 10, 12 and 14, a state where the pointer 7 such as a finger is touching is illustrated. In FIGS. 11, 13, and 15, a state where the high dielectric material 703 such as water adheres to the first touch region 102c1 of the protective plate 3, that is, a region on the end sensors 102a, 102b and the metal frame 801, for example.

FIGS. 10 to 15 illustrate a plurality of units of capacitance. Self capacitance (Cg) 709 is self capacitance of each of the sensors 102a, 102b, and the electrostatic capacitance 701 is electrostatic capacitance formed between the pointer 7 or the high dielectric material 703 and each of the sensors 102a, 102b. The coupling capacitance 707 is coupling capacitance formed between the pointer 7 or the high dielectric material 703 and the shield layer 105, and the coupling capacitance 711 is coupling capacitance formed between the shield layer 105 and the metal frame 801. The parasitic capacitance between the shield layer 105 and the apparatus casing 9 can be described in the same manner as the coupling capacitance 711. However, it is omitted for the sake of simplicity of the drawing.

As described with reference to FIG. 6, the parasitic capacitance 710 is parasitic capacitance formed between the shield layer 105 and the pressure sensor electrode 107a. As described with reference to FIG. 6, the coupling capacitance (pressure sensor capacitance) 708 is coupling capacitance formed between the pressure sensor electrode 107a and the metal frame 801, to be detected by the pressure sensor 107. The coupling capacitance (pressure sensor capacitance) 708 varies as the distance between the pressure sensor electrode 107a and a conductor or a dielectric body (in this case, the metal frame 801) is changed by the pressing pressure applied by the pointer to the touch surface.

Now, the voltage of the shield layer 105 differs among the state of FIGS. 10 and 11, the state of FIGS. 12 and 13, and the state of FIGS. 14 and 15. Specifically, in the related touch panel illustrated in FIGS. 10 and 11, the shield layer 105 is in a floating state (high impedance state). In the touch panel according to the first preferred embodiment illustrated in FIGS. 12 and 13, the shield layer 105 is connected to the GND. In a preferred touch panel according to the first preferred embodiment illustrated in FIGS. 14 and 15, the shield layer 105 is connected to the GND via the excitation signal circuit 202. In the configurations of FIGS. 14 and 15, the excitation signal circuit 202 is capable of applying, to the shield layer 105, a signal having the same phase as that of an excitation signal at the time of detecting the electrostatic capacitance by the sensors 102a, 102b, and a signal having the same phase as that of an excitation signal at the time of detecting electrostatic capacitance by the pressure sensor 107.

Next, for each of the above-mentioned three states, description will be given on a parasitic capacitance component (hereinafter also referred to as "Cet") that becomes an error factor at the time of detecting electrostatic capacitance by the sensors 102a, 102b and a parasitic capacitance component (hereinafter also referred to as "Cef") that becomes an error factor at the time of detecting electrostatic capacitance by the pressure sensor 107.

<Related Touch Panel>

First, the related touch panel illustrated in FIGS. 10 and 11 will be described. In FIG. 10 and FIG. 11, the shield layer 105 is not connected to anything and is in a floating state (high impedance state).

<Related Touch Panel: Self Capacitance Viewed from Sensors 102a, 102b>

The self capacitance (the sum of every parasitic capacitance) viewed from the sensors 102a and 102b in FIGS. 10 and 11 is expressed as C709+(C701//(C702+(C707//(C711+(C710//C708))))). Note that [A+B] indicates that the connection between A and B is a parallel connection, and [A//B] indicates that the connection between A and B is a serial connection.

The capacitance increased by a touch in FIG. 10 and the capacitance increased by adhesion of the high dielectric material 703 such as water in FIG. 11 are expressed by an expression in which C709 is deleted from the above expression. Specifically, it is expressed as C701//(C702+(C707//(C711+(C710//C708)))). From this expression, the parasitic capacitance Cet that becomes an error at the time of detection by the touch sensor 102 is expressed as C707//(C711+(C710//C708).

In the touch state of FIG. 10, the human body capacitance C702 approximately ranges from 40 pF to 100 pF, and is sufficiently larger than Cet. Accordingly, if noise does not enter the metal frame 801, influence on the touch capacitance C701 by the parasitic capacitance Cet is sufficiently small.

In a state where the high dielectric material 703 adheres as illustrated in FIG. 11, the high dielectric material 703 is not grounded (virtually grounded). Accordingly, the human body capacitance C702 in FIG. 10 is almost 0 (zero), and in FIG. 11, the human body capacitance C702 is not illustrated. In the self capacitance type configuration in which all sensors are excited at the same potential, all of the sensors 102a, 102b of the touch panel are at almost equal potentials, and the capacitance between the respective sensors 102a, 102b is also small. Therefore, in a state where the high dielectric material 703 adheres and in the configuration of the self-capacitance type, the parasitic capacitance Cet may become a degree (100 fF or more) that cannot be ignored with respect to C701, which causes an error in touch detection performed by the touch sensor 102.

<Related Touch Panel: Self Capacitance Viewed from Pressure Sensor Electrode 107a>

The self capacitance (the sum of every parasitic capacitance) as viewed from the pressure sensor electrode 107a in FIGS. 10 and 11 is expressed as C708+(C710//(C711+(C707//(C702+(C701//C709))))).

The capacitance that is desired to be detected as a pressing pressure is the pressure sensor capacity C708. Therefore, the parasitic capacitance Cef (parasitic capacitance between the pressure sensor electrode 107a and the pointer 7) that becomes an error at the time of detection performed by the pressure sensor 107 in FIGS. 10 and 11 is expressed as C710//(C711+(C707//(C702+C701//C709)))).

The human body capacitance C702 approximately ranges from 40 pF to 100 pF, which is sufficiently larger relative to C707. Therefore, in FIG. 11, the parasitic capacitance Cef≈C710//(C711+C707). C707 is a value of about 1 pF or less which is a small value. However, when the variation amount of the pressure sensor capacity C708 is small, it causes an error in pressure detection performed by the pressure sensor 107.

<Touch Panel According to First Preferred Embodiment>

Next, a touch panel according to the first preferred embodiment illustrated in FIGS. 12 and 13 will be described. In FIGS. 12 and 13, the shield layer 105 is connected to the GND.

<Touch Panel According to First Preferred Embodiment: Self Capacitance Viewed from Sensors 102a, 102b>

In the self capacitance (sum of every parasitic capacitance) viewed from the sensors 102a, 102b in FIGS. 12 and 13, the parasitic capacitance connected to the GND side from the shield layer 105, as viewed from the sensors 102a, 102b, does not affect. Therefore, the self capacitance is C709+(C701//(C702+C707)), and the parasitic capacitance Cet that becomes an error at the time of detection by the touch sensor 102 is C707.

In the touch state of FIG. 12, the parasitic capacitance Cet is sufficiently smaller than the human body capacitance C702 as described above. Accordingly, the effect on the touch capacitance C701 is sufficiently small.

In a state where the high dielectric material 703 adheres in FIG. 13, the parasitic capacitance Cet may become a degree (100 fF or more) that cannot be ignored with respect to C701 as in the state of FIG. 11, which causes an error in touch detection by the touch sensor 102. However, since the parasitic capacitance Cet in FIG. 13 is reduced as compared with the parasitic capacitance Cet in FIG. 11, an error in touch detection performed by the touch sensor 102 can be reduced as compared with the related touch panel.

<Touch Panel According to First Preferred Embodiment: Self Capacitance Viewed from Pressure Sensor Electrode 107a>

The self capacitance (sum of every parasitic capacitance) as viewed from the pressure sensor electrode 107a in FIGS.

12 and 13 is expressed as C708+C710. That is, in the first preferred embodiment, when the shield layer 105 is connected to the GND, the capacitance C707 formed between the pressure sensor electrode 107a and the pointer 7 or the high dielectric material 703 is not included in the capacitance detected as a pressing pressure. As a result, it is possible to reduce an error in pressure detection performed by the pressure sensor 107 as compared with the related touch panel. However, even in that case, not only C708 but C710 are included in the self capacitance as viewed from the pressure sensor electrode 107a.

<Preferred Touch Panel According to First Preferred Embodiment>

Next, a touch panel according to the first preferred embodiment illustrated in FIGS. 14 and 15 will be described. In FIGS. 14 and 15, at the time of detection by the touch sensor 102, a signal having the same phase as that of an excitation signal for detecting the electrostatic capacitance of the touch sensor 102 is applied to the shield layer 105. Then, when an AC signal having the same phase as that of an excitation signal applied to the touch sensor 102 is being applied to the shield layer 105, the touch panel controller 2 generates touch information by using a change in the electrostatic capacitance detected by the touch sensor 102.

Further, at the time of detection by the pressure sensor 107, a signal having the same phase as that of the excitation signal for detecting the electrostatic capacitance of the pressure sensor 107 is applied to the shield layer 105. Then, when an AC signal having the same phase as that of the excitation signal applied to the pressure sensor 107 is applied to the shield layer 105, the touch panel controller 2 generates touch information by using a change in the electrostatic capacitance detected by the pressure sensor 107.

<Preferred Touch Panel According to First Preferred Embodiment: Self Capacitance Viewed from Sensors 102a, 102b>

In the self capacitance viewed from the sensors 102a, 102b in FIGS. 14 and 15, by applying a signal having the same phase as that of the excitation signal for measuring the electrostatic capacitance of the touch sensor panel 1 to the shield layer 105, C707 does not affect. Therefore, the self capacitance is C709+(C701//C702), and the parasitic capacitance Cet that becomes an error in the touch detection by the touch sensor 102 substantially disappears.

Not only in the touch state of FIG. 14, even in a state where the high dielectric material 703 adheres as illustrated in FIG. 15, the parasitic capacitance Cet that becomes an error in the touch detection by the touch sensor 102 also disappears. Therefore, in the touch panel of FIGS. 14 and 15, as compared with the touch panel of FIGS. 12 and 13, an error in touch detection by the touch sensor 102 can be reduced, and the robustness when the water adheres is improved.

<Preferable Touch Panel According to First Preferred Embodiment: Self Capacitance Viewed from Pressure Sensor Electrode 107a>

In the self capacitance (the sum of every parasitic capacitance) viewed from the pressure sensor electrode 107a in FIGS. 14 and 15, when a signal having the same phase as that of the excitation signal for detecting the electrostatic capacitance of the pressure sensor 107 is applied to the shield layer 105, C710 does not affect. Therefore, the self capacitance is expressed as C708, without including the parasitic capacitance C710 between the pressure sensor electrode 107a and the pointer 7. Therefore, in the touch panel illustrated in FIGS. 14 and 15, it is possible to reduce an error in pressure detection by the pressure sensor 107, as compared with the touch panel illustrated in FIGS. 12 and 13.

<Summary of First Preferred Embodiment>

According to the touch sensor panel 1 of the first preferred embodiment as described above, the shield layer 105 suppresses the coupling capacitance 707 that is electrostatic capacitance formed between the pressure sensor 107 and the dielectric body outside the touch panel such as the pointer 7 or the high dielectric material 703. According to such a configuration, it is possible to reduce the noise of the electrostatic capacitance detected by the pressure sensor 107 for detecting the pressure on the touch surface of the touch sensor panel 1. Therefore, the detection performance of the pressure sensor 107 can be enhanced.

Moreover, according to the first preferred embodiment, touch information is generated with use of a change in the electrostatic capacitance detected by the touch sensor 102 when an AC signal having the same phase as that of the excitation signal applied to the touch sensor 102 is applied to the shield layer 105. In addition, touch information is generated with use of a change in the electrostatic capacitance detected by the pressure sensor 107 when an AC signal having the same phase as that of the excitation signal applied to the pressure sensor 107 is applied to the shield layer 105. According to such a configuration, the robustness at the time of water adhesion is improved, so that an error at the time of detecting a pressing pressure can be reduced.

Furthermore, according to the first preferred embodiment, the touch panel controller 2 performs control to generate coordinates of a position touched by the pointer on the first touch region 102c1, based on a change in the electrostatic capacitance detected by the touch sensor 102 and a change in the electrostatic capacitance detected by the pressure sensor 107. In addition, the touch panel controller 2 performs control to generate coordinates of a position touched by the pointer on the second touch region 102c2, based on a change in the electrostatic capacitance detected by the touch sensor 102. According to such a configuration, since the pointer 7 can be distinguished from the high dielectric material 703 such as water, it is possible to suppress erroneous detection in which adhesion of the high dielectric material 703 to the touch surface is detected as a touch of the pointer 7 to the touch surface.

<Modification 1>

In the above description, an example of a pattern layout of the shield layer 105, the insulating layer 106, and the pressure sensor electrode 107a, as viewed from the surface on the opposite side of the touch surface, has been described with reference to FIG. 7. However, the pattern layout is not limited thereto.

For example, in the case of giving priority to the optical performance, the shield layer 105, the insulating layer 106, and the pressure sensor electrode 107a may be formed in a region other than the touch region and hence other than the display region, as illustrated in FIG. 7, 16, 17 or a combination thereof.

Figure 18:
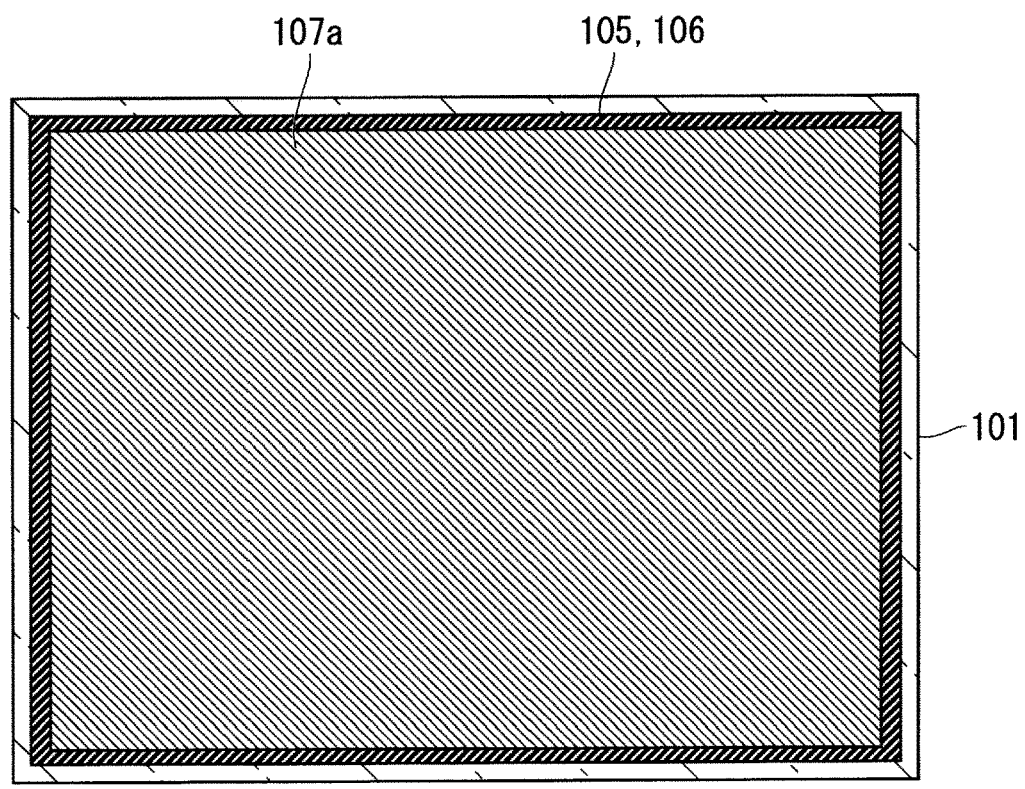
Figure 19:
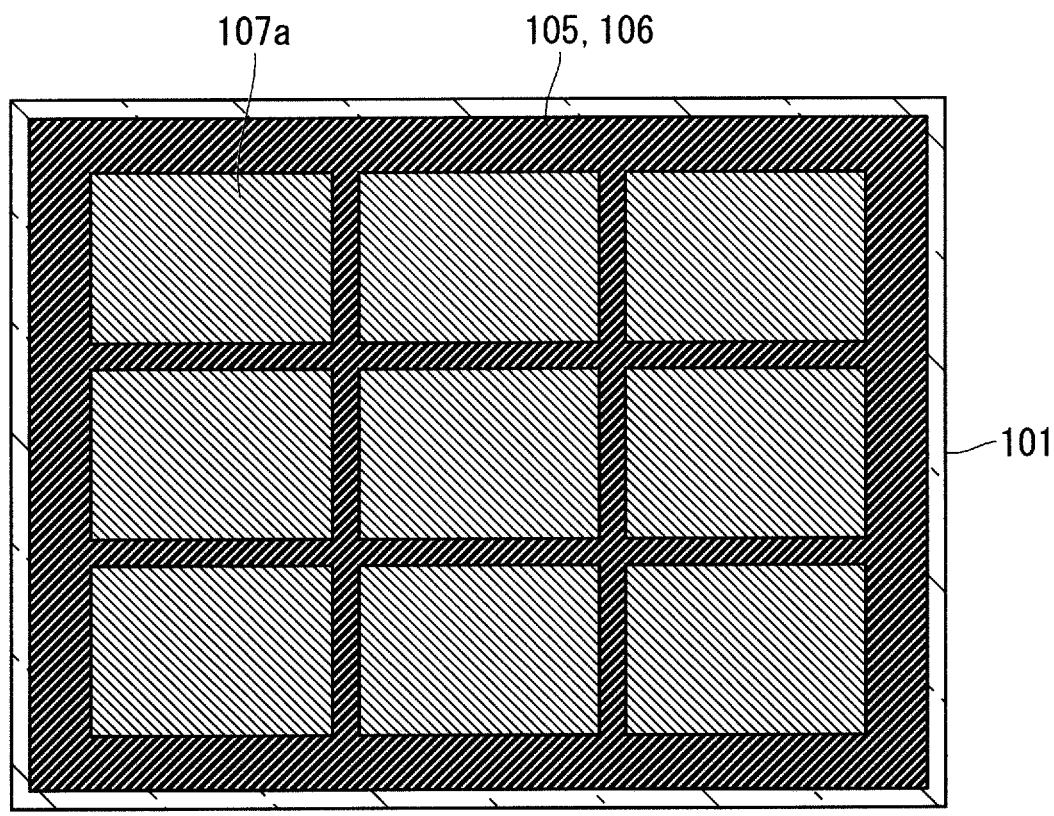

Further, in the case of giving priority to the sensitivity performance of the pressure sensor rather than the optical performance, for example, the shield layer 105, the insulating layer 106, and the pressure sensor electrode 107a may be disposed within the display area, as illustrated in FIG. 18 or 19.

In the case of detecting only presence or absence of a pressure, it is preferable to provide one pressure sensor electrode 107a so as to increase the area of the pressure sensor electrode 107a as much as possible as illustrated in FIG. 7 or 18. This improves the detection sensitivity. However, in such a configuration, since the position of the pressure cannot be detected, when the pointer 7 touches the center of the touch surface in a state where a high dielectric material such as water adheres to the peripheral portion of the touch surface, there is a possibility that the high dielectric material is detected as a pointer and the coordinates thereof are output.

Figure 16:
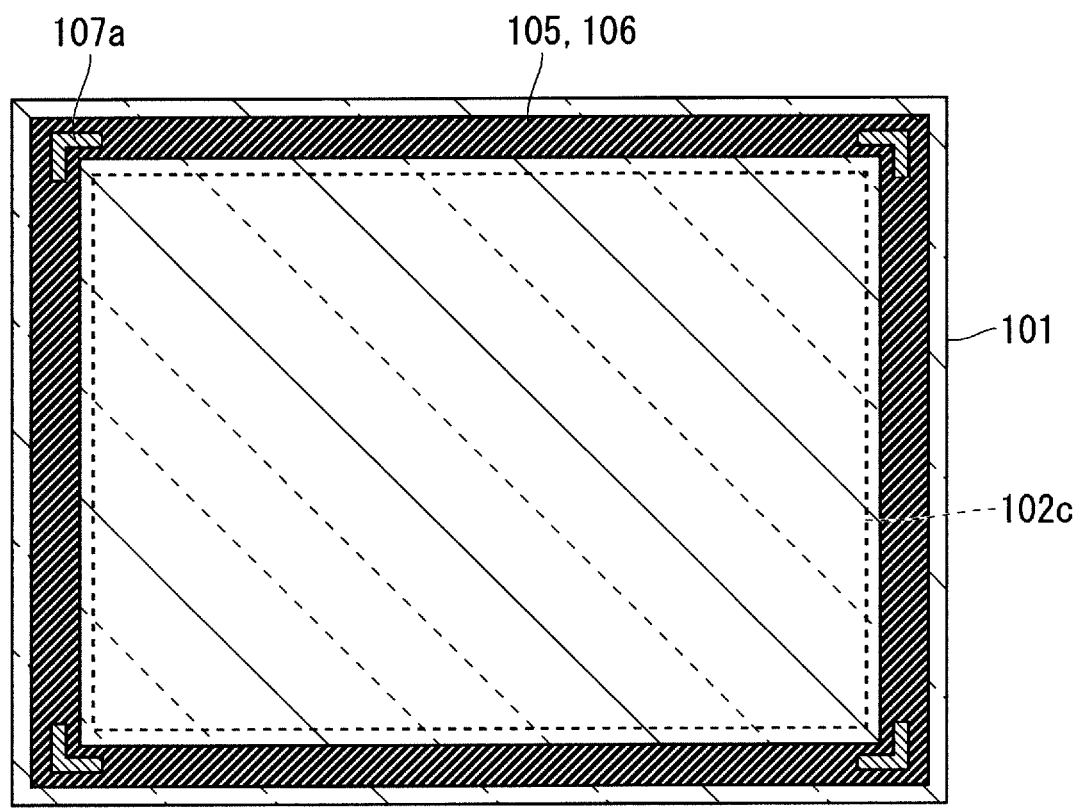
FIGS. 16 to 19 are plan views each illustrating an exemplary structure to which a touch panel according to Modification 1 is applied.
Figure 17:
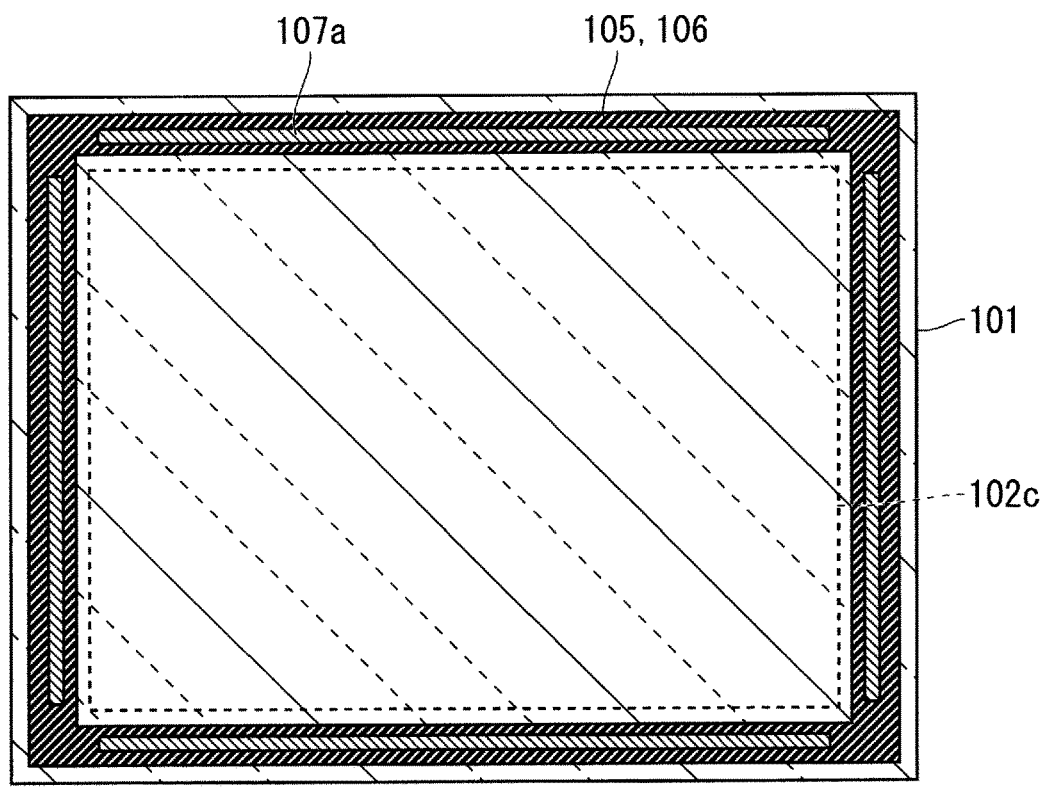

On the other hand, as illustrated in FIG. 16, 17, 19, or a combination thereof, by providing a plurality of pressure sensor electrodes 107a and hence a plurality of pressure sensors 107 so as to be able to grasp the approximate position to which the pressure is applied, it is possible to further suppress detection of a high dielectric material as a pointer. The number of the pressure sensor electrodes 107a may be determined according to the sensitivity and the number of detections required for calculation (the number of the pressure sensors 107).

<Modification 2>

Figure 20:
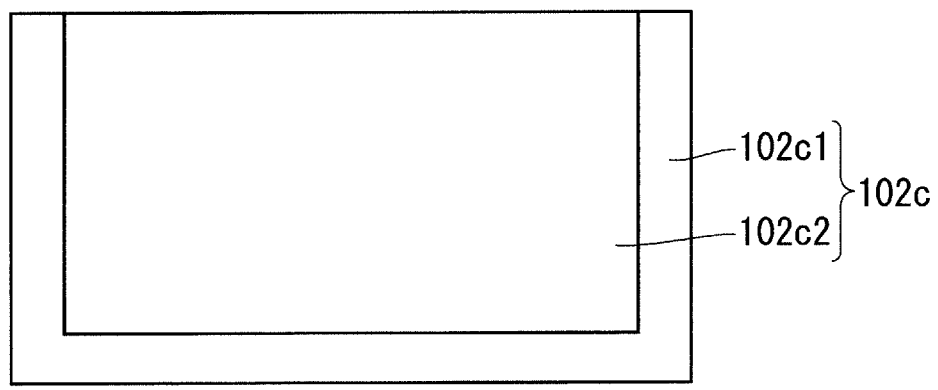
FIGS. 20 to 22 are plan views each illustrating a detectable region according to Modification 2.
Figure 21:
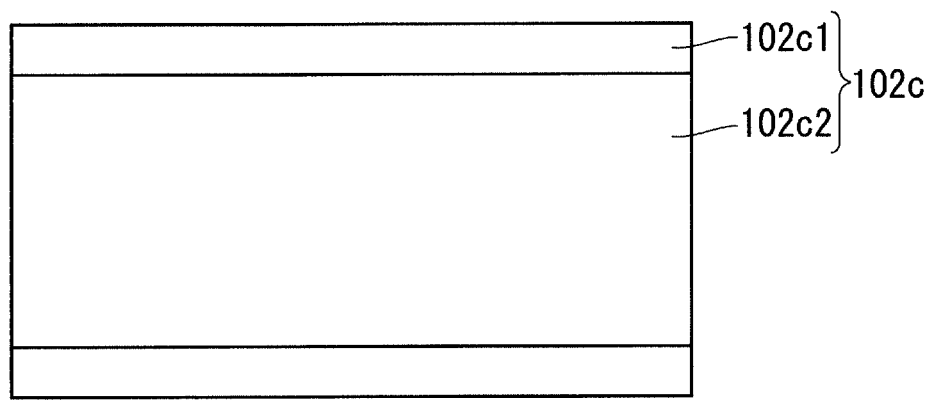
Figure 22:
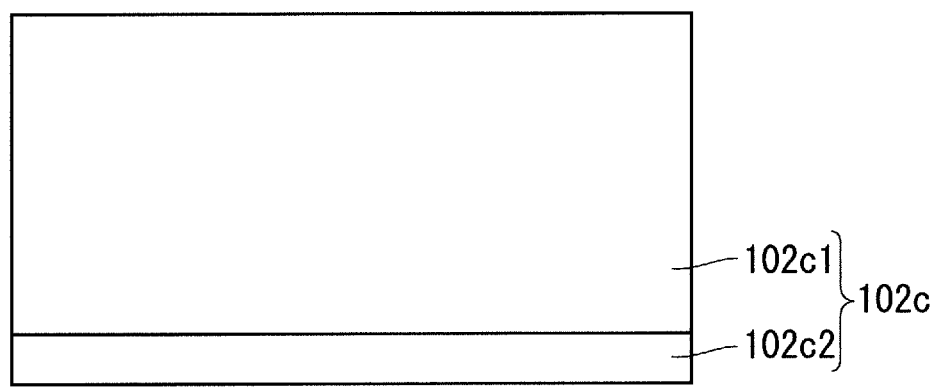

In the above description, an example in which the first touch region 102c surrounds the entire periphery of the second touch region 102c2 has been described with reference to FIG. 9. However, the present invention is not limited thereto. For example, in an apparatus in which a touch panel is disposed outdoors, a touch panel is often disposed vertically together with a display apparatus, and erroneous detections are often made at a lower portion of the screen where water runs down. As described above, depending on the arrangement condition of the touch panel, the portion where erroneous detection is likely to occur is often different. Therefore, the first touch region 102c1 and the second touch region 102c2 may be defined as illustrated in FIG. 20, 21, or 22.

Further, in FIGS. 9 and 20 to 22, the first touch region 102c1 and the second touch region 102c2 are illustrated with the short direction of the detectable region 102c as the direction of gravity. However, the first touch region 102c1 and the second touch region 102c2 are not limited thereto. For example, the upper and lower sides of the detectable region 102c may be reversed due to a viewing angle or the like, or the length of the vertical direction of the detectable region 102c may be longer than that of the lateral direction for convenience of products or the like.

Second Preferred Embodiment

FIGS. 23 to 26 are cross-sectional views each illustrating an exemplary structure to which a touch panel according to a second preferred embodiment of the present invention is applied. The second preferred embodiment differs from the first preferred embodiment in that the insulating layer 106, the pressure sensor electrode 107a, and the like are provided on a decorative member 301 provided on the protective plate 3. The structure of FIGS. 23 and 25 also differs from the first preferred embodiment in that the pressure sensor 107 does not detect the capacitance formed between the pressure sensor electrode 107a and the metal frame 801, but detects the capacitance formed between the pressure sensor electrode 107a and the apparatus casing 9. This means that in the structure of FIGS. 23 and 25, the pressure sensor 107 is configured of the pressure sensor electrode 107a and the apparatus casing 9, and in the structure of FIGS. 24 and 26, the pressure sensor 107 is configured of the pressure sensor electrode 107a and the metal frame 801.

Figure 23:
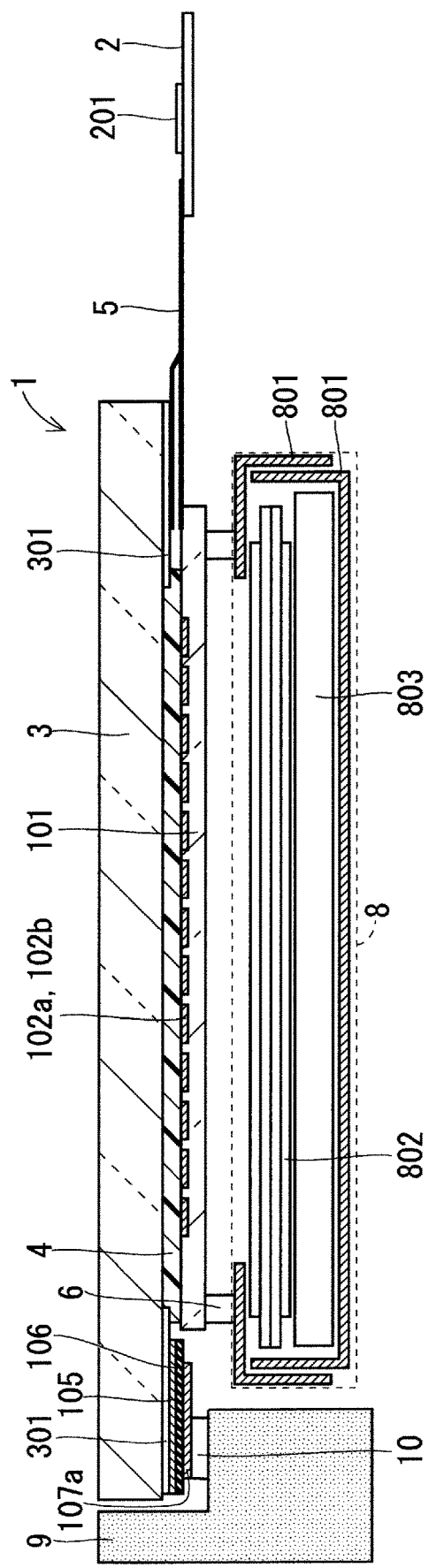
FIGS. 23 to 26 are cross-sectional views each illustrating an exemplary structure to which a touch panel according to a second preferred embodiment is applied.

Now, in a general projection-type electrostatic capacitive touch panel, the size of the protective plate 3 is larger than the size of the touch sensor panel 1 due to its design, waterproofness, and the like. Therefore, as illustrated in FIG. 23 and elsewhere, it is preferable to dispose the shield layer 105, the insulating layer 106, and the pressure sensor 107 in this order on the decorative member 301 of the protective plate 3 rather than on the touch sensor panel 1, because the pressure sensor 107 can be increased and the sensitivity of the pressure sensor 107 can be improved. In other words, the sensitivity of the pressure sensor 107 can be improved when the shield layer 105 is disposed on the decorative member 301 and the insulating layer 106 is disposed between the shield layer 105 and the pressure sensor 107. Furthermore, in general, the point that the decorative member 301 is provided on the outer peripheral portion of the display area is also advantageous for detecting pressing in the outer peripheral region.

Figure 24:
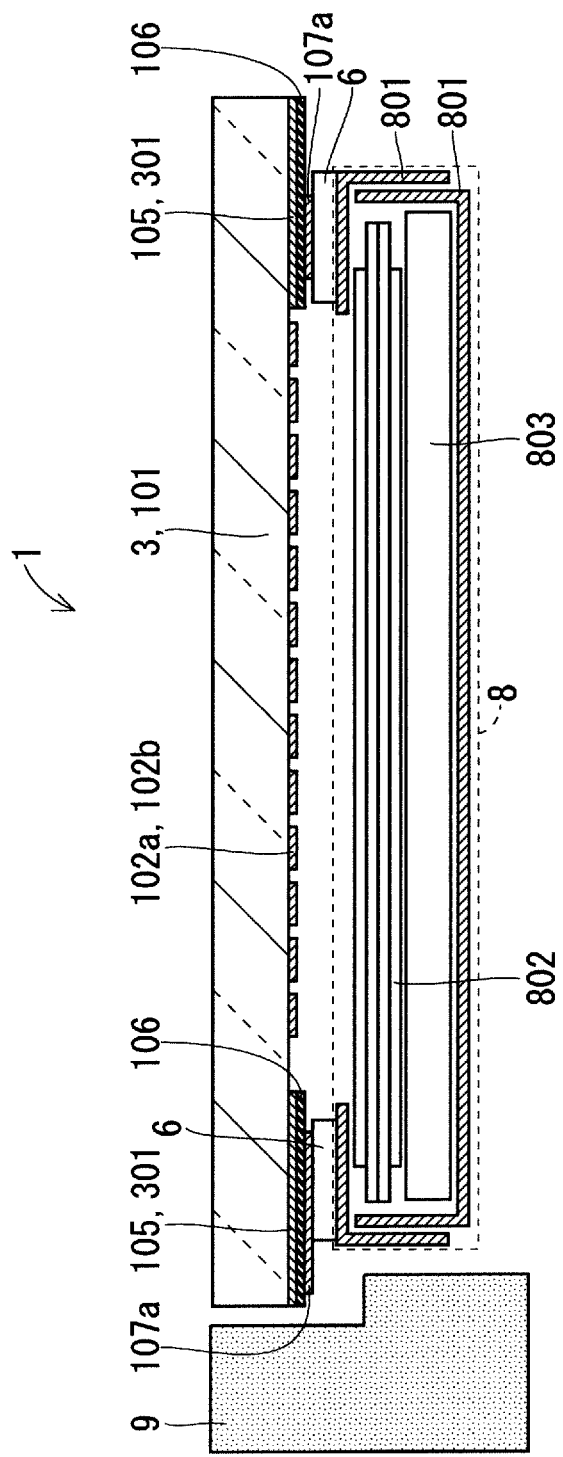

FIG. 24 illustrates a touch panel having a one glass solution (OGS) structure in which the transparent substrate 101 and the protective plate 3 are integrated. In the OGS structure, it is possible to impart conductivity to the decorative member 301. According to such an OGS structure, since the shield layer 105 has light-shielding property and can be used as the decorative member 301 by being decorated, it is expected to reduce the material. Further, according to the OGS structure, since the pressure sensor electrode 107a and the sensors 102a, 102b constituting the touch sensor 102 are disposed on the same surface, it is expected to be easily able to crimp them with the FPC by ACF or the like.

It is noted that in an electrostatic capacitive touch panel in which the shield layer 105, the insulating layer 106, and the pressure sensor 107 are arranged in this order on the decorative member 301, the sensor material, the structure, and the detection method are not limited to those of the configuration illustrated in FIGS. 23 and 24.

Figure 25:
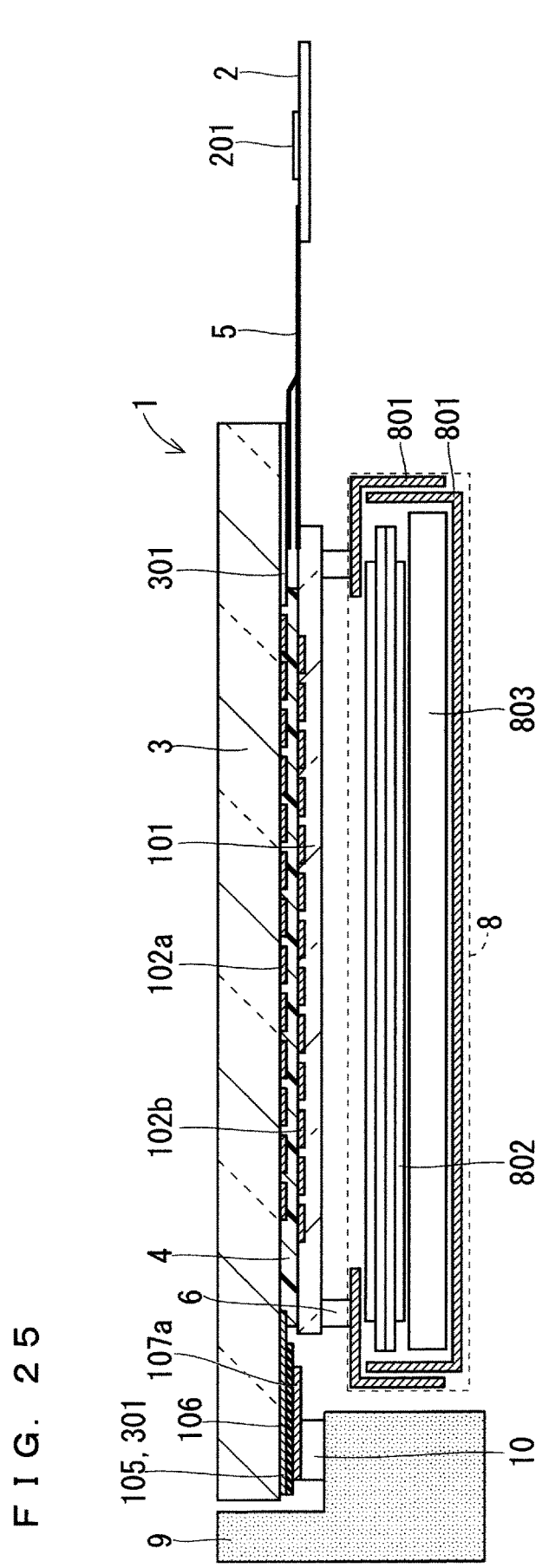
Figure 26:
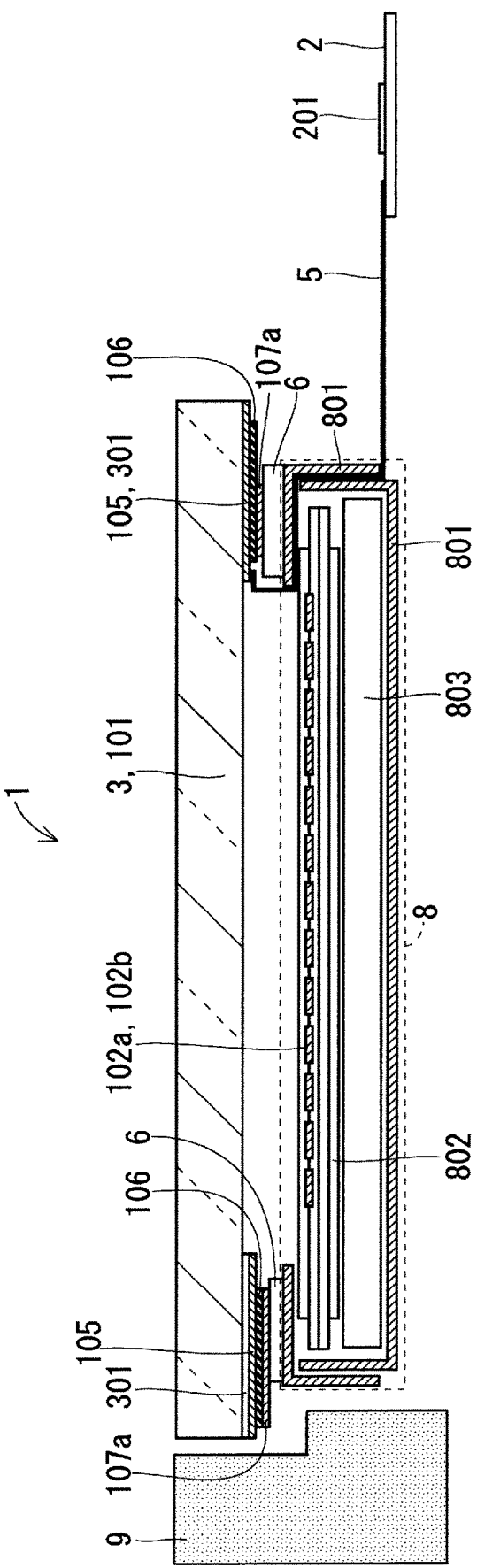

For example, a structure in which the protective plate 3 having the OGS structure and the transparent substrate 101 are bonded together as illustrated in FIG. 25, or a structure of an in-cell capacitive touch panel as illustrated in FIG. 26, may be acceptable. In addition, the above-described Modifications 1 and 2 may be applied to the second preferred embodiment.

Other Modifications

In the touch panel described above, it is described that the touch sensor 102 is configured of X-Y matrix type sensors 102a, 102b, but it is not limited thereto. It may be configured of a segment type single layer structure sensor, for example.

Further, in the above description, the configuration in which the touch sensor panel 1 and the liquid crystal module 8 are bonded by the double-sided tapes 6, 10 has been described. However, the present invention is not limited thereto. The space between the touch sensor panel 1 and the liquid crystal module 8 may be filled with a transparent resin or the like that can be elastically deformed, and optical bonding in which there is no boundary surface between each of the touch sensor panel 1 and the liquid crystal module 8 and the air layer may be used in place of the double-sided tapes 6, 10. With such a configuration, it is possible to improve the visibility by decreasing the reflectance or the like. Further, as the display apparatus, not only a liquid crystal display apparatus using a liquid crystal, but also a display apparatus using an organic electroluminescence (EL) or other display method can be applied.

In the present invention, the respective preferred embodiments and the respective modifications can be freely combined or appropriately modified or omitted within the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A touch panel comprising:
a touch sensor panel including an electrostatic capacitance detection sensor capable of detecting a change in electrostatic capacitance formed between the touch sensor panel and a pointer;
a pressure sensor capable of detecting a pressure on a touch surface of the touch sensor panel as a change in electrostatic capacitance;
a touch panel controller that performs control to generate information relating to a touch by a pointer on the touch surface, based on the change in the electrostatic capacitance detected by the electrostatic capacitance detection sensor and the change in the electrostatic capacitance detected by the pressure sensor;
a shield layer including a conductive material disposed between the touch surface and the pressure sensor, the shield layer being overlapped with at least a part of the pressure sensor as viewed from the touch surface; and
an insulating layer that electrically insulates the shield layer from the pressure sensor wherein
the touch sensor panel further includes a decorative member provided to a region other than a region in which the electrostatic capacitance detection sensor is provided, on the surfaces opposite to the touch surface, as viewed from the touch surface,
the shield layer is disposed on the decorative member, and
the insulating layer is disposed between the shield layer and the pressure sensor.

2. The touch panel according to claim 1, wherein
the shield layer is disposed on a surface opposite to the touch surface of the touch sensor panel, and
the insulating layer is disposed between the shield layer and the pressure sensor.

3. The touch panel according to claim 1, wherein
the shield layer has a light shielding property and is decorated.

4. The touch panel according to claim 1, wherein
the touch panel controller generates the information with use of the change in the electrostatic capacitance detected by the pressure sensor when an AC signal having a same phase as a phase of an excitation signal applied to the pressure sensor is applied to the shield layer.

5. The touch panel according to claim 1, wherein
a detectable region detectable by the electrostatic capacitance detection sensor, of the touch surface, includes a first touch region defined at an end of the detectable region and a second touch region that is a region other than the first touch region of the detectable region, and
the touch panel controller performs control to generate coordinates of a position touched by the pointer on the first touch region, based on a change in the electrostatic capacitance detected by the electrostatic capacitance detection sensor and a change in the electrostatic capacitance detected by the pressure sensor, and performs control to generate coordinates of a position touched by the pointer on the second touch region based on a change in the electrostatic capacitance detected by the electrostatic capacitance detection sensor.

6. The touch panel according to claim 1, wherein
the shield layer is directly or indirectly connected to a ground potential.

7. A display apparatus in which the touch panel according to claim 1 is provided on a display surface side of the display apparatus.

8. The touch panel according to claim 1, wherein the touch surface is configured to be touched by the pointer.

9. The touch panel according to claim 1, wherein the shield layer is capable of suppressing or blocking electrostatic capacitance formed between the pressure sensor and the pointer from being sensed at the pressure sensor.

10. A touch panel comprising:
a touch sensor panel including an electrostatic capacitance detection sensor capable of detecting a change in electrostatic capacitance formed between the touch sensor panel and a pointer;
a pressure sensor capable of detecting a pressure on a touch surface of the touch sensor panel as a change in electrostatic capacitance;
a touch panel controller that performs control to generate information relating to a touch by a pointer on the touch surface, based on the change in the electrostatic capacitance detected by the electrostatic capacitance detection sensor and the change in the electrostatic capacitance detected by the pressure sensor;
a shield layer including a conductive material disposed between the touch surface and the pressure sensor, the shield layer being overlapped with at least a part of the pressure sensor as viewed from the touch surface; and
an insulating layer that electrically insulates the shield layer from the pressure sensor, wherein
the touch sensor panel further includes:
a structure including the electrostatic capacitance detection sensor; and
a protective plate that protects the structure and has a surface that is the touch surface, and
the protective plate includes a decorative member provided to a region other than a region in which the electrostatic capacitance detection sensor is provided, on the surface opposite to the touch surface, as viewed from the touch surface.

11. A touch panel comprising:
a touch sensor panel including an electrostatic capacitance detection sensor capable of detecting a change in electrostatic capacitance formed between the touch sensor panel and a pointer;
a pressure sensor capable of detecting a pressure on a touch surface of the touch sensor panel as a change in electrostatic capacitance;
a touch panel controller that performs control to generate information relating to a touch by a pointer on the touch surface, based on the change in the electrostatic capacitance detected by the electrostatic capacitance detection sensor and the change in the electrostatic capacitance detected by the pressure sensor;
a shield layer including a conductive material disposed between the touch surface and the pressure sensor, the shield layer being overlapped with at least a part of the pressure sensor as viewed from the touch surface; and
an insulating layer that electrically insulates the shield layer from the pressure sensor, wherein
the touch panel controller generates the information with use of the change in the electrostatic capacitance detected by the electrostatic capacitance detection sensor when an AC signal having a same phase as a phase of an excitation signal applied to the electrostatic capacitance detection sensor is applied to the shield layer.

* * * * *